(12) United States Patent
Esfahlani et al.

(10) Patent No.: US 11,601,192 B2
(45) Date of Patent: Mar. 7, 2023

(54) MULTI-BEAM METASURFACE ANTENNA

(71) Applicant: Kymeta Corporation, Redmond, WA (US)

(72) Inventors: Hussein Esfahlani, Redmond, WA (US); Seyed Mohamad Amin Momeni Hasan Abadi, Redmond, WA (US); Mohsen Sazegar, Kirkland, WA (US); Chris Eylander, Kent, WA (US); Ryan Stevenson, Woodinville, WA (US)

(73) Assignee: KYMETA CORPORATION, Redmond, WA (US)

( * ) Notice: Subject to any disclaimer, the term of this patent is extended or adjusted under 35 U.S.C. 154(b) by 55 days.

(21) Appl. No.: 17/244,165

(22) Filed: Apr. 29, 2021

(65) Prior Publication Data

US 2022/0006511 A1 Jan. 6, 2022

Related U.S. Application Data

(60) Provisional application No. 63/048,581, filed on Jul. 6, 2020, provisional application No. 63/019,151, filed on May 1, 2020.

(51) Int. Cl.
*H04B 7/185* (2006.01)
*H04B 7/0408* (2017.01)
*H01Q 3/26* (2006.01)

(52) U.S. Cl.
CPC ....... *H04B 7/18513* (2013.01); *H01Q 3/2676* (2013.01); *H04B 7/0408* (2013.01)

(58) Field of Classification Search
CPC ............ H04B 7/18513; H04B 7/18515; H04B 7/18517; H04B 7/0408; H01Q 3/2676
See application file for complete search history.

(56) References Cited

U.S. PATENT DOCUMENTS

| | | | |
|---|---|---|---|
| 10,333,217 B1* | 6/2019 | Black | H01Q 13/20 |
| 10,522,897 B1* | 12/2019 | Katko | H01Q 21/0037 |
| 11,069,975 B1* | 7/2021 | Mason | H01Q 1/246 |
| 2014/0009357 A1 | 1/2014 | Tiezzi et al. | |
| 2016/0233588 A1 | 8/2016 | Bily et al. | |
| 2016/0261042 A1* | 9/2016 | Sazegar | H01Q 21/064 |
| 2016/0261043 A1* | 9/2016 | Sazegar | H01Q 3/24 |

(Continued)

OTHER PUBLICATIONS

International Search Report and Wirtten Opinion on the Patentability of Application No. PCT/US2021/030240 dated Aug. 27, 2021, 12 pages.

*Primary Examiner* — Raymond S Dean
(74) *Attorney, Agent, or Firm* — Womble Bond Dickinson (US) LLP

(57) ABSTRACT

A multibeam antenna and method of using the same are described. In one embodiment, the antenna comprises an aperture having a plurality of radio-frequency (RF) radiating antenna elements. The RF radiating antenna elements generate a plurality of beams simultaneously in different directions in response to a first modulation pattern for holographic beamforming applied to the plurality of RF radiating antenna elements to establish all beams of the plurality of beams such that antenna elements of the plurality of RF radiating antenna elements contribute to all beams in the plurality of beams concurrently. The antenna also includes a controller coupled to the aperture to generate the first modulation pattern.

16 Claims, 18 Drawing Sheets

(56) References Cited

U.S. PATENT DOCUMENTS

| | | |
|---|---|---|
| 2018/0269576 A1 | 9/2018 | Scarborough et al. |
| 2018/0301821 A1* | 10/2018 | Black ................. H01Q 15/0066 |
| 2018/0323511 A1* | 11/2018 | Urzhumov ........... H01Q 3/2605 |
| 2019/0237873 A1 | 8/2019 | Sazegar et al. |
| 2019/0238375 A1 | 8/2019 | Bowen et al. |
| 2019/0379135 A1* | 12/2019 | Sharawi ................... H01Q 1/48 |
| 2021/0273700 A1* | 9/2021 | Wyckoff .............. H04B 7/0695 |

* cited by examiner

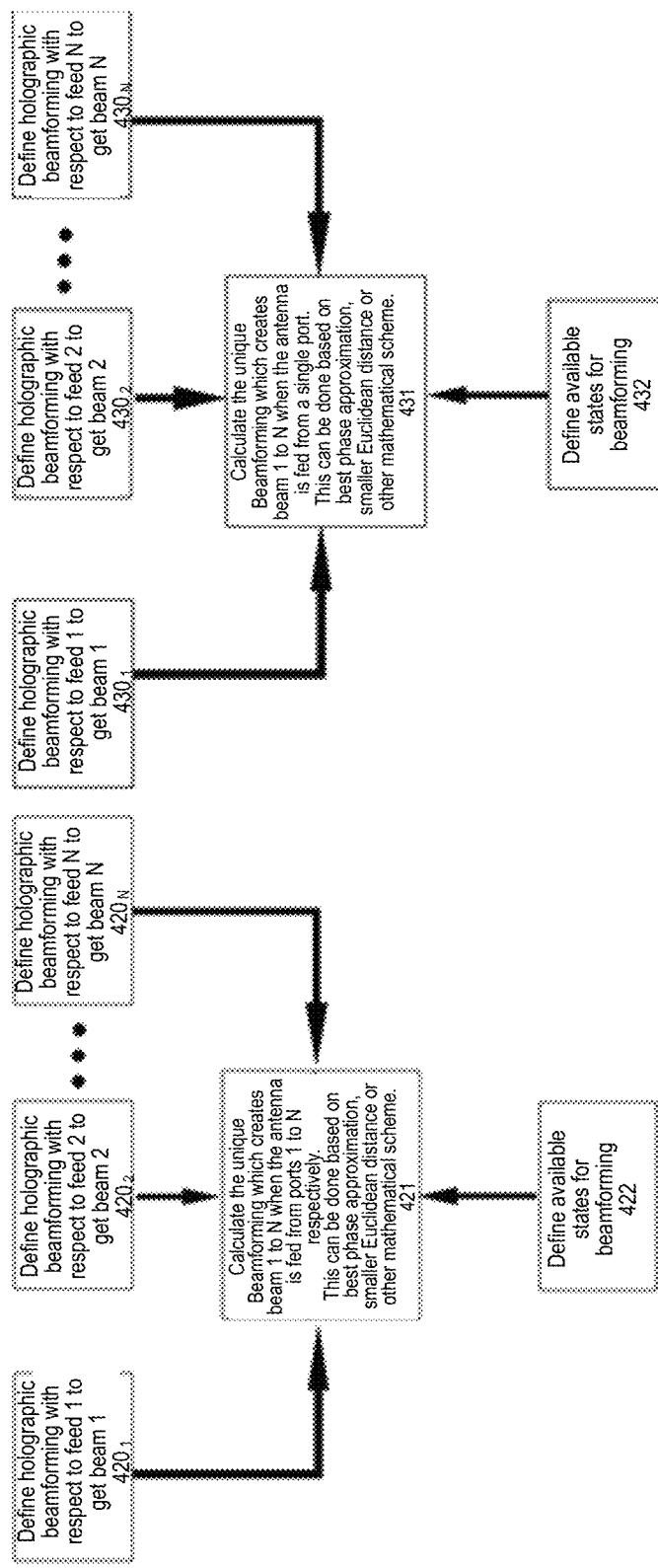

Iris L2

Iris L1

Patch and Iris L1

Top View

MULTI-BEAM METASURFACE ANTENNA

RELATED APPLICATION

The present application claims the benefit 35 USC 119(e) of U.S. Provisional Patent Application No. 63/019,151, titled "Multifeed-Multibeam Metasurface Antenna", filed May 1, 2020 and U.S. Provisional Patent Application No. 63/048,581, titled "Multi-beam Metasurface Antenna", filed on Jul. 6, 2020, both of which are incorporated by reference in their entirety.

FIELD OF THE INVENTION

Embodiments of the present invention are related to wireless communication; more particularly, embodiments of the present invention are related to an antenna that generates multiple beams with a single aperture controlled by one beamforming modulation.

BACKGROUND

Reconfigurable antennas are able to change their properties in a dynamic matter. These properties typically include frequency, radiation pattern, and polarization properties. One type of reconfigurable antenna is a radio-frequency (RF) metamaterial antenna. Some of these RF metamaterial antennas operate with multiple bands and/or high frequencies, such as the Ku and Ka frequency bands. One type of metamaterial antenna uses liquid crystal (LC)-based RF radiating metamaterial antenna elements, while another type relies on varactor-based RF radiation elements.

In some current reconfigurable antennas, only a single wireless link between the satellite and the end user can be created. Therefore, if multiple wireless links would be desirable at times, such as in the case of make-before-break situations, these reconfigurable antennas could not provide two wireless links and the satellite antenna would have to interrupt an existing wireless link to set up the new wireless link, thereby potentially losing valuable data and/or customer satisfaction.

Some metamaterial antennas have one aperture that generates multiple beams with their RF radiating antenna elements. In such a case, the antenna creates two beams at two different frequencies and different antenna elements are used for each of the different beams. Thus, one beam is generated at one frequency with a portion of the antenna elements of an aperture while another beam is being generated at a different frequency with different antenna elements of the aperture. These technologies do not allow for the creation of two beams and channels operating at the same frequency.

Furthermore, other technologies exist that include apertures that create two beams at two different frequencies using multiple feed ports. This allows the signals to be kept isolated from each other, and they can be connected to separate sets of RF chains. However, in these cases, the aperture is used as two terminals that share the same aperture.

SUMMARY

A multibeam antenna and method of using the same are described. In one embodiment, the antenna comprises an aperture having a plurality of radio-frequency (RF) radiating antenna elements. The RF radiating antenna elements generate a plurality of beams simultaneously in different directions in response to a first modulation pattern for holographic beamforming applied to the plurality of RF radiating antenna elements to establish all beams of the plurality of beams such that antenna elements of the plurality of RF radiating antenna elements contribute to all beams in the plurality of beams concurrently. The antenna also includes a controller coupled to the aperture to generate the first modulation pattern.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4C illustrates one embodiment of a beamforming procedure for a multibeam antenna with a multi-feed.

FIG. 4D illustrates one embodiment of a beamforming procedure for a multibeam antenna with a single feed.

DETAILED DESCRIPTION

Figure 1A:
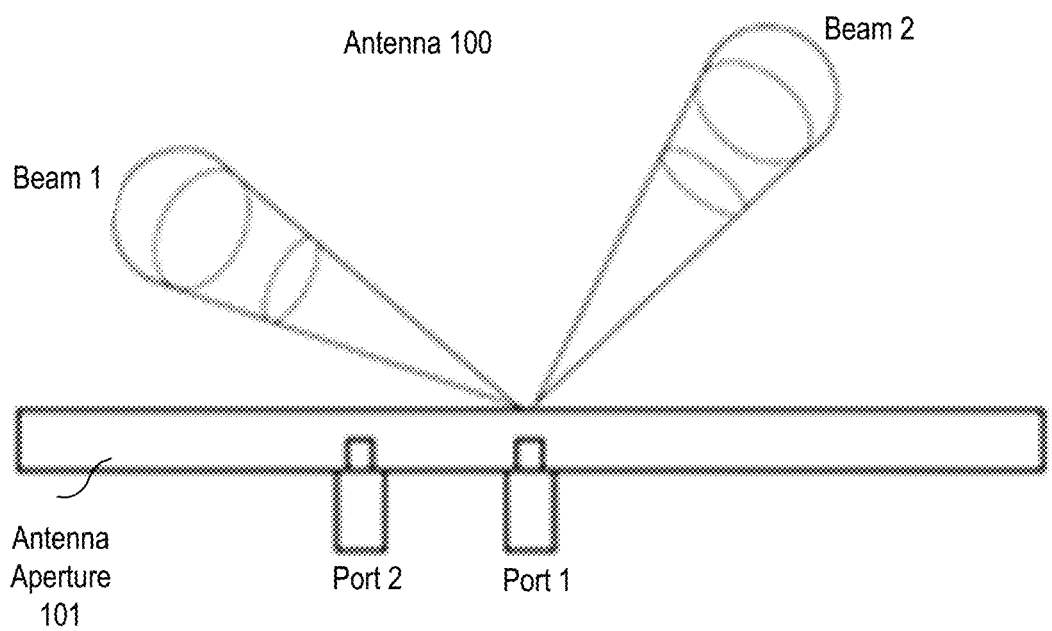
FIGS. 1A-1C illustrate one embodiment of an antenna with multi-feed, multi-beam configuration.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

An antenna and methods for design of such an antenna are described herein. In one embodiment, the antenna is a satellite antenna for use in a network terminal of a satellite communication system. In one embodiment, the antenna is a radial slot antenna. In one embodiment, the antenna is a metasurface antenna having radio-frequency (RF) radiating antenna elements. In one embodiment, the metasurface antenna is a radial slot antenna. In one embodiment, the RF radiating antenna elements are metamaterial surface scattering antenna elements. In one embodiment, the metamaterial surface scattering antenna elements are liquid crystal (LC)-based antenna elements. Examples of such antenna elements and antennas are described below. In alternative embodiments, the metamaterial surface scattering antenna elements are antenna elements that use a varactor diode or other tuning mechanism as opposed to LC such as, for example, those described in U.S. patent application Ser. No. 16/991,924, entitled "Metasurface Antennas Manufactured with Mass Transfer Technologies," filed on Aug. 12, 2020. Note that the techniques can be used with non-satellite antennas.

In one embodiment, the metasurface antenna has one or more feed ports for feeding one or more feed waves to the RF radiating antenna elements and generates two or more reconfigurable radiating beams in response to these one or more feed waves. In one embodiment, these two or more radiating beams are independently controlled beams between the antenna and satellites and are spatially separated. That is, the antenna creates multiple single channels simultaneously that are independent of each other. Such communication is useful in use cases when creating more than one reconfigurable link at a time is crucial. In one embodiment, a metasurface antenna disclosed herein can communicate through two independent feeds and channels (beam) with two LEO satellites at a time where each beam or channel can be reconfigured in real-time based on the location and polarization of the satellite with respect to the antenna. For example, communication to a satellite in a LEO constellation requires that the beam is switched from one satellite to the next upcoming satellite, and if a multi-beam functionality is not provided, the data will be lost during the transition time. With multiple independent beams, a new link can be set up before the existing one is interrupted (make-before-break). In other use cases, operating two beams simultaneously increases the throughput of the antenna as more data can be transferred with two or more channels. Thus, this multi-beam innovation improves the performance of an antenna by creating more communication channels that can be used to communicate with multiple satellites at a time.

In one embodiment, a metasurface antenna with a single feed port can be modified to possess one or more feed ports and two or more distinct radiation patterns while feed(s) receives from, and/or transmits through, distinct radiation beams in any arbitrary direction and polarization. In other words, using the techniques described herein, an antenna that is capable of creating only a single reconfigurable beam that communicates through one feed port can be modified to become an antenna that is able to have more than one reconfigurable beam at a time which can communicate through one or several feed ports.

Thus, using the techniques disclosed herein, the problem of having more than one reconfigurable wireless channel at a time using one antenna unit is solved. In one embodiment, by using a minor hardware modification in the current state of an antenna (adding additional feed port in the multi-feed case) and a new beamforming algorithm, an antenna can have with multi-beam capability. This capability can enable an antenna to establish an additional beam and connect to another satellite while the first link is maintained.

Examples of Multibeam Antenna Configurations

Multibeam antennas described herein have one of two configurations: a multi-feed, multi-beam antenna configuration and a single-feed, multi-beam antenna configuration. In the multi-feed, multi-beam configuration, the antenna creates several independent communication links (transmit/receive) with no additional modifications in communication channels. In the single-feed multi-beam antenna, the antenna can be also used to establish several transmit channels at a time to transfer data from the antenna to two or more stations. In one embodiment, the single-feed, multi-beam antenna can be used in the receive mode for networks where time-division-duplexing is used to create communication links. In one embodiment, time division can be used to create several independent receiving channels through single feed. Any set of orthogonal communication techniques (e.g. spread spectrum, etc.) that can provide a means for separating the received singles through a single feed from two or more spatially separated channels can be a used for receiving mode when implementing this type of antenna configuration.

In one embodiment, the antenna described herein comprises an aperture having a plurality of radio-frequency (RF) radiating antenna elements to generate a plurality of beams simultaneously in different directions. The number of beams may be two or more. In one embodiment, these beams are generated in response to a modulation pattern for holographic beamforming applied to the plurality of RF radiating antenna elements to establish all beams of the plurality of beams such that antenna elements of the plurality of RF radiating antenna elements contribute to all beams in the plurality of beams concurrently. A controller coupled to the aperture generates the modulation pattern that is applied to the antenna elements of the aperture to generate multiple beams.

As set forth above, the antenna can be configured with one or multiple feeds, or ports (e.g., two ports, three ports, etc.), to provide the multiple beams. In the case of a multi-feed configuration, in one embodiment, an antenna (e.g., a radial slot antenna) has an aperture that is fed through two different and independent ports where each port creates a beam in a specific direction, and those beams are defined by a unique beamforming modulation that satisfies the creation of both beams, namely beam 1 for port 1 and beam 2 for port 2. In other words, beamforming modulation is designed and applied to the antenna elements of the aperture to create the two beams such that antenna elements of the aperture contribute to both beams when ports 1 and 2 are fed with feed waves. In one embodiment, the beamforming modulation comprises a modulation pattern applied to antenna elements of the antenna aperture to create both beams 1 and 2 when fed by the feed waves from ports 1 and 2.

In receive mode, the signal that is received over beam 1 arrives dominantly at feed port 1 and the beam received over beam 2 arrives dominantly at port 2. The two beams can be at the same exact frequency. In one embodiment, splitting between the signals occurs through the modulation and the spatial location of the feed ports. In transmit mode, the two beams operate in the same manner as described for the receive mode. Receive and transmit can occur at the same time in the same manner as provided in current antennas for only one beam. Therefore, in one embodiment, in this configuration, the multi-beam antenna will have two or more full-duplex beams.

The frequencies of the two beams can be the same or different. This applies to receive and transmit, e.g. the frequency of the receive beams can be the same while the transmit beams are at the same or different frequencies, or vice versa.

Figure 1B:
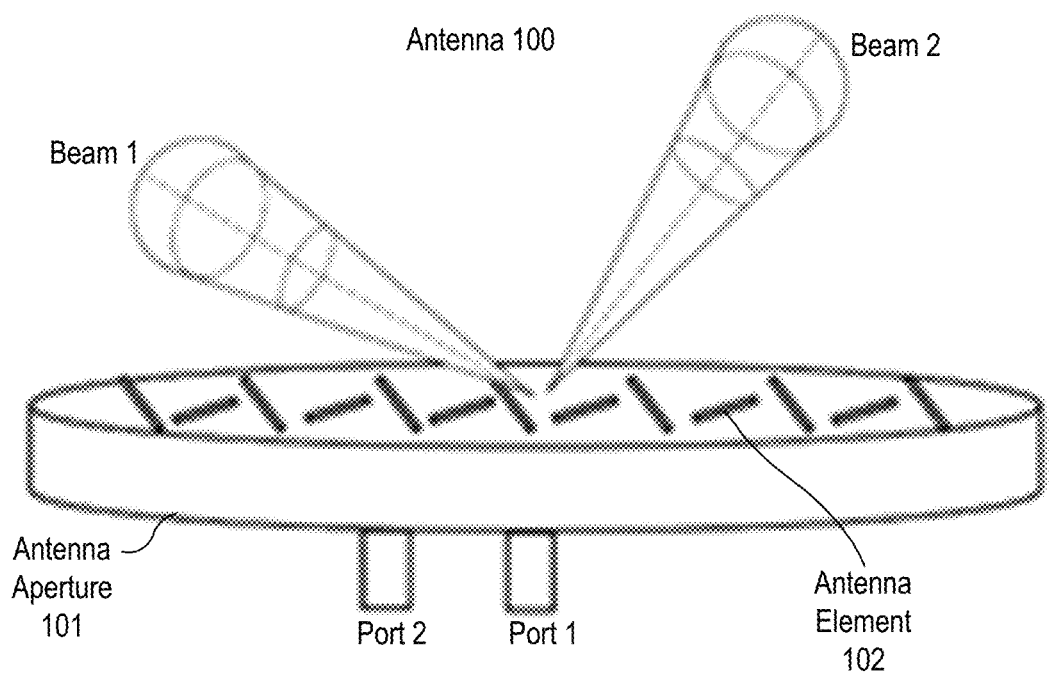
Figure 1C:
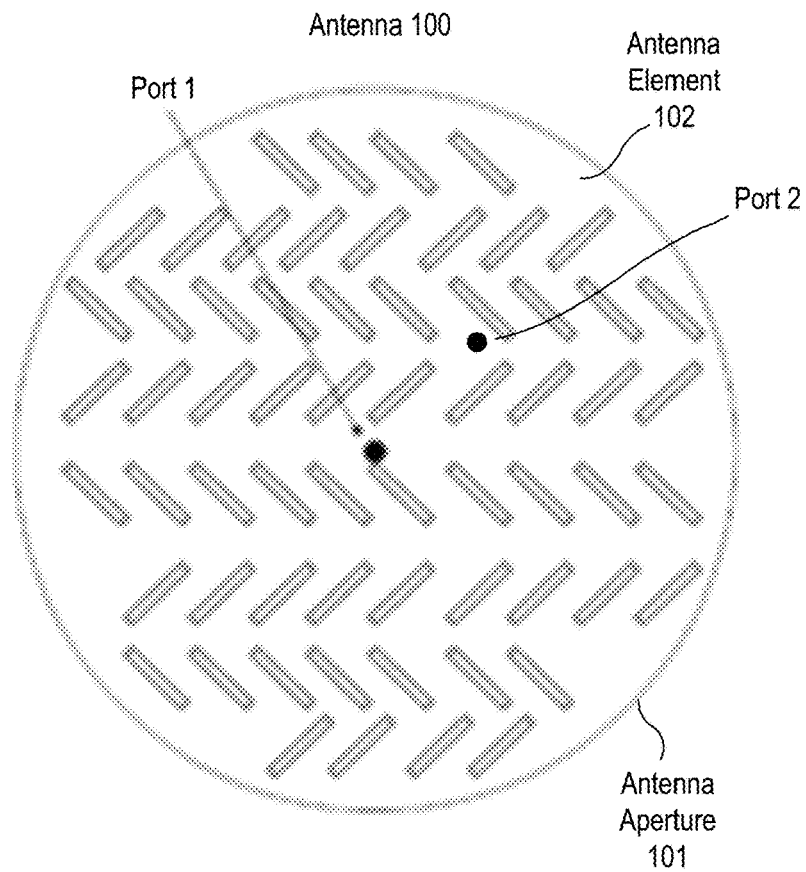

FIGS. 1A-1C illustrate one embodiment of an antenna with a multi-feed, multi-beam configuration. Referring to FIGS. 1A-1C, antenna 100 includes an antenna aperture 101 that has antenna elements 102. In one embodiment, aperture 101 comprises a metasurface and antenna elements 102 comprise metamaterial surface scattering antenna elements (e.g., liquid crystal (LC)-based antenna elements, varactor diode-based antenna elements, etc.). Antenna aperture 101 includes two ports, port 1 and port 2 and generates beam 1 and beam 2.

Figure 2A:
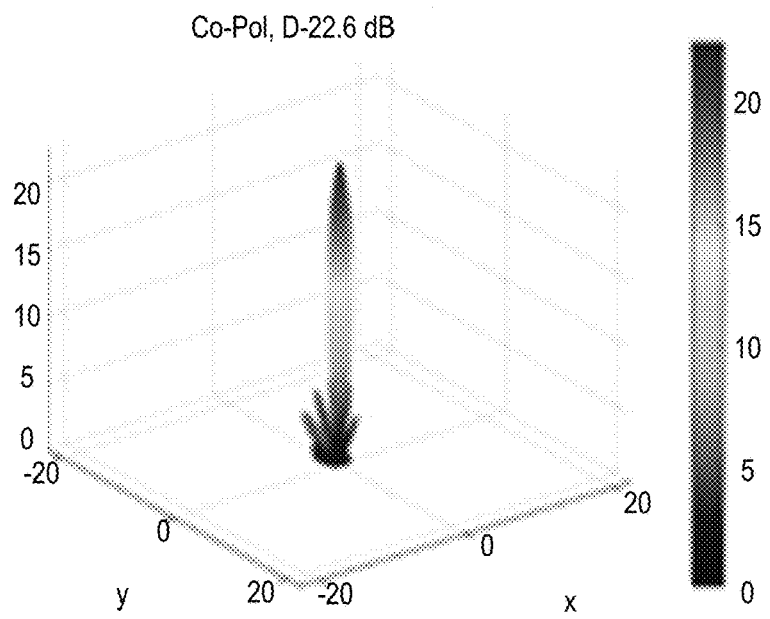
FIGS. 2A-2C illustrate the radiation patterns of a metasurface antenna that is fed at the same frequency through two ports.
Figure 2B:
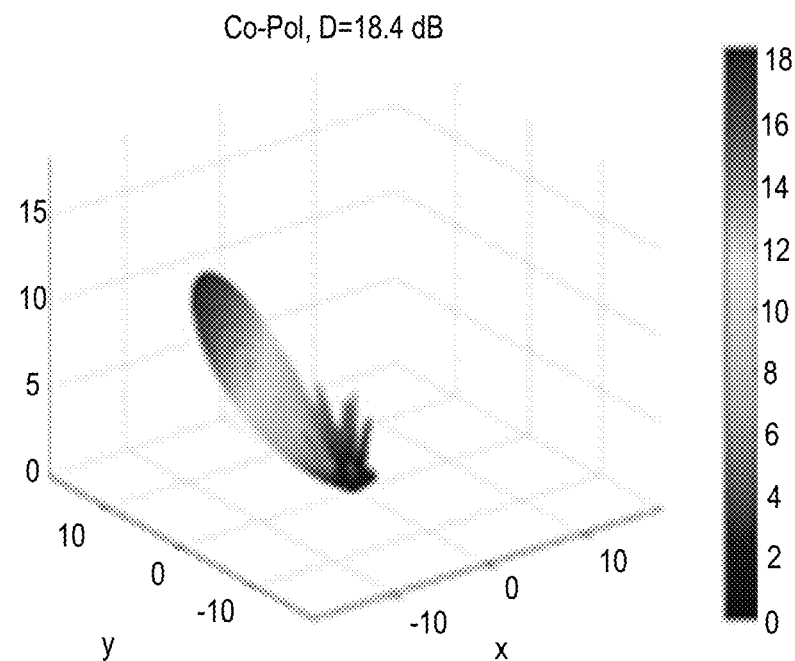
Figure 2C:
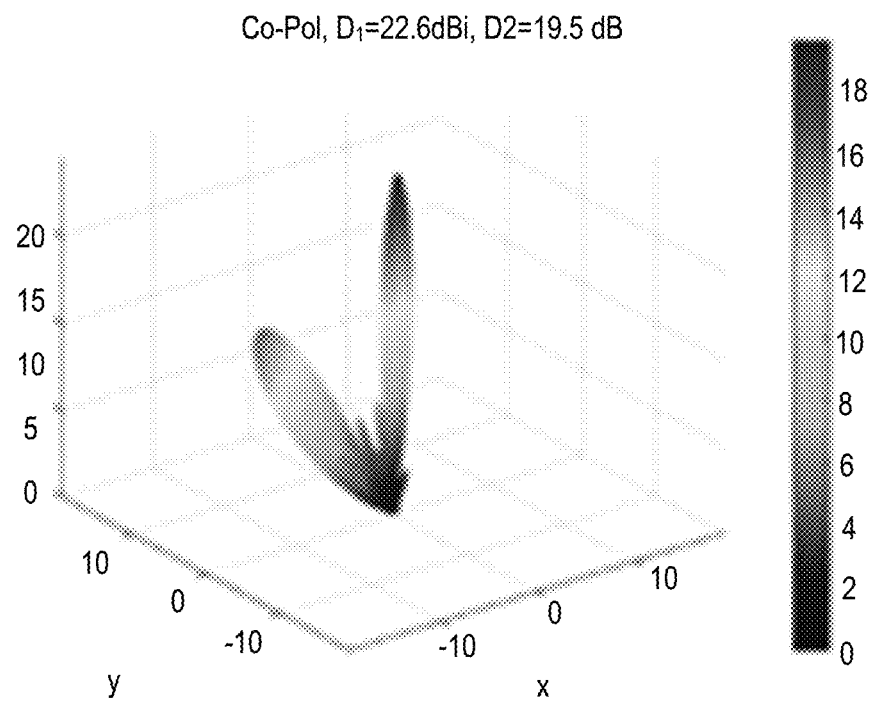

FIGS. 2A-2C illustrate the radiation patterns of a metasurface antenna that is fed at the same frequency through two ports. A modulation pattern has been applied to establish two beams in the directions of $\theta_1=0°$, $\varphi_1=45°$, $LPA_1=35°$ and $\theta_2=60°$, $\varphi_2=110°$, $LPA_2=60°$, where each of them communicates through feed number one and two, respectively.

FIG. 2A illustrates a radiation pattern of the metasurface antenna when it is fed through port 1 of FIGS. 1A-1C with radiation characteristics $\theta_1=0°$, $\varphi_1=45°$, $LPA_1=35°$. FIG. 2B illustrates a radiation pattern of the metasurface antenna when it is fed through port 2 with the radiation characteristics $\theta_2=60°$, $\varphi_2=110°$, $LPA_2=60°$. FIG. 2C illustrates a radiation pattern of the metasurface antenna when it is fed through both ports simultaneously with radiation characteristics $\theta_1=0°$, $\varphi_1=45°$, $LPA_1=35°$ and $\theta_2=60°$, $\varphi_2=110°$, $LPA_2=60°$.

In a single-feed configuration, in one embodiment, a metasurface antenna is fed through one port and creates two beams in two different directions, and each beam is defined by a unique beamforming modulation that satisfies the creation of both beam 1 and beam 2 with respect to one port. In other words, beamforming modulation is applied to antenna elements of the antenna aperture to create both beams 1 and 2 when fed by a feed wave from one port. In one embodiment, the beamforming modulation is in the form of a modulation pattern applied to antenna elements of the antenna aperture.

In the transmit mode, the signal that is transmitted from port 1 will go through beam 1 and beam 2. In the receive mode, the signals are received from each of the two beams at exact same frequency through a single port. In one embodiment, the splitting between the signals is accomplished through the time-division-duplexing such that this type of antenna receives in communication links with specific communication modulations.

In one embodiment, in either the multi-feed or single feed configurations, the beamforming modulation applied to the antenna elements is able to establish both beams (e.g., beams 1 and 2 of FIGS. 1A-1C and FIGS. 3A-3C). In one embodiment, the beamforming modulation is provided by an antenna controller that generates a beam pattern that is sent, or otherwise provided, to the antenna aperture. In one embodiment, the beam pattern is a holographic beam pattern that comprises complex numbers for each antenna element and the complex number for each element is selected based on the individual antenna element's contribution to both beams. In other words, in one embodiment, individual antenna elements are controlled via a complex number from the beamforming modulation pattern and that number is selected so that the individual antenna elements serves both beams.

Figure 3A:
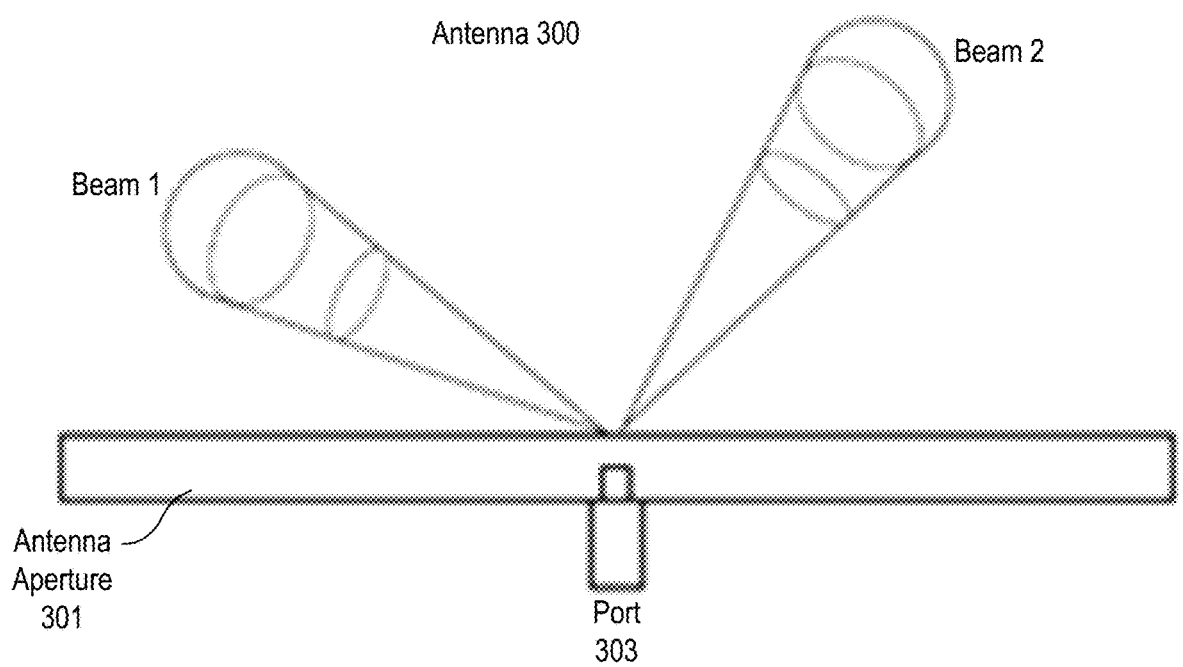
FIGS. 3A-3C illustrate one embodiment of an antenna with a single-feed multi-beam configuration.
Figure 3B:
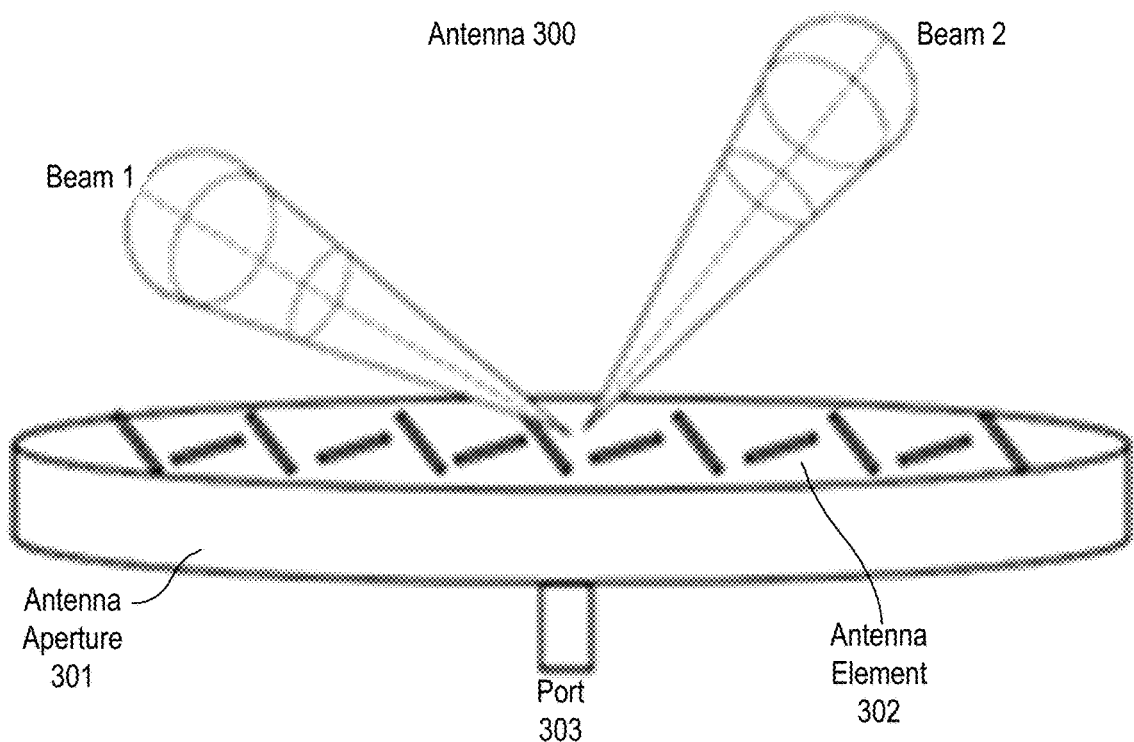
Figure 3C:
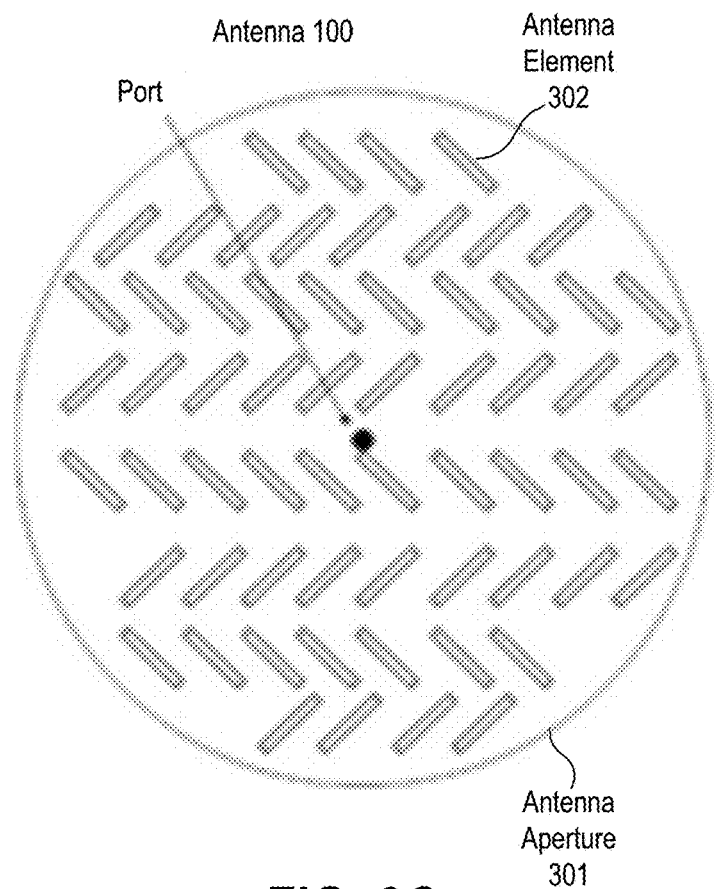

FIGS. 3A-3C illustrate one embodiment of an antenna with a single-feed multi-beam configuration. Referring to FIGS. 3A-3C, antenna 300 includes an antenna aperture 301. Antenna aperture 301 includes antenna elements 302. In one embodiment, aperture 301 comprises a metasurface and antenna elements 302 comprise metamaterial surface scattering antenna elements (e.g., liquid crystal (LC)-based antenna elements, varactor diode-based antenna elements, etc.). Antenna aperture 301 includes a single port, port 303, that generates beam 1 and beam 2.

Figure 3D:
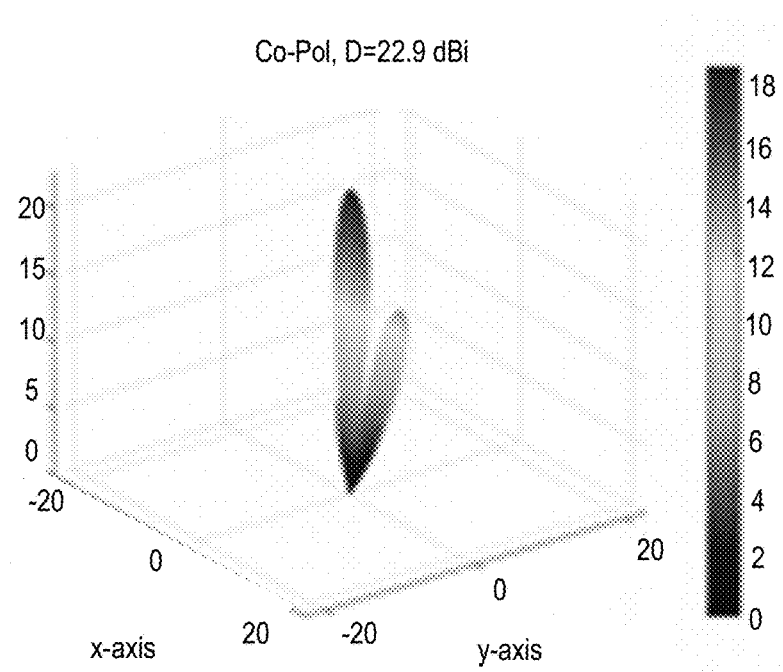
FIG. 3D illustrates an example of the radiation patterns of a metasurface antenna that is fed at the same frequency through a single port.

FIG. 3D illustrates an example of the radiation patterns of a metasurface antenna that is fed at the same frequency through a single port. Referring to FIG. 3D, a unique modulation pattern has been applied to establish two beams in the directions (e.g., radiation characteristics) of $\theta_1=0°$, $\varphi_1=45°$, $LPA_1=35°$ and $\theta_2=60°$, $\varphi_2=110°$, $LPA_2=60°$, where each of them communicates through one feed.

In one embodiment, in either the multi-feed or single feed configurations, the beamforming modulation applied to the antenna elements is able to establish both beams (e.g., beams 1 and 2 of FIGS. 1A-1C and FIGS. 3A-3C). In one embodiment, the beamforming modulation is provided by an antenna controller that generates a beam pattern that is sent, or otherwise provided, to the antenna aperture. In one embodiment, the beam pattern is a holographic beam pattern that comprises complex numbers for each antenna element and the complex number for each element is selected based on the individual antenna element's contribution to both beams. In other words, in one embodiment, individual antenna elements are controlled via a complex number from the beamforming modulation pattern and that number is selected so that the individual antenna elements serves both beams.

In the multi-feed configuration, by adding the second port (feed) to the antenna and applying the appropriate beamforming that satisfies the creation of both beam 1 and beam 2, the antenna can be used to establish two independent links to communicate with multiple satellite that are spatially separated. By using the beamforming modulation disclosed herein, a reconfigurable single beam, single feed antenna can be transformed into a multibeam-multi-feed antenna.

In one embodiment, for the single-feed multi-beam configuration, to achieve the multiple beams, specific modulation (beamforming) is applied on the antenna at the software level and no additional hardware modification is required.

Other factors may influence the performance of the multi-feed and single-feed configuration disclosed above. By adjusting these aspects of the antenna, performance may be improved. The following software and hardware aspects may be adjusted to achieve a certain performance for all beams:

1) port location, including the location of the ports in the multi-feed configuration impacts the quality of the isolation between the beams. From the modulation pattern point of view, if the spacing between the ports increases, the correlation between modulation patterns will decrease, and that improves the isolation between the multiple beams. As an example, in a linear configuration, the best isolation can be achieved if the ports are placed at two extremities of the linear array. This concept can be also extended to an array in a radial configuration.

2) density of the antenna elements over the aperture;
3) weighting of modulation for each antenna element and every set of modulations;
4) phase of each modulations with respect to each other; and
5) phase of the input waves with respect to each other.

Figures 4A, 4B:
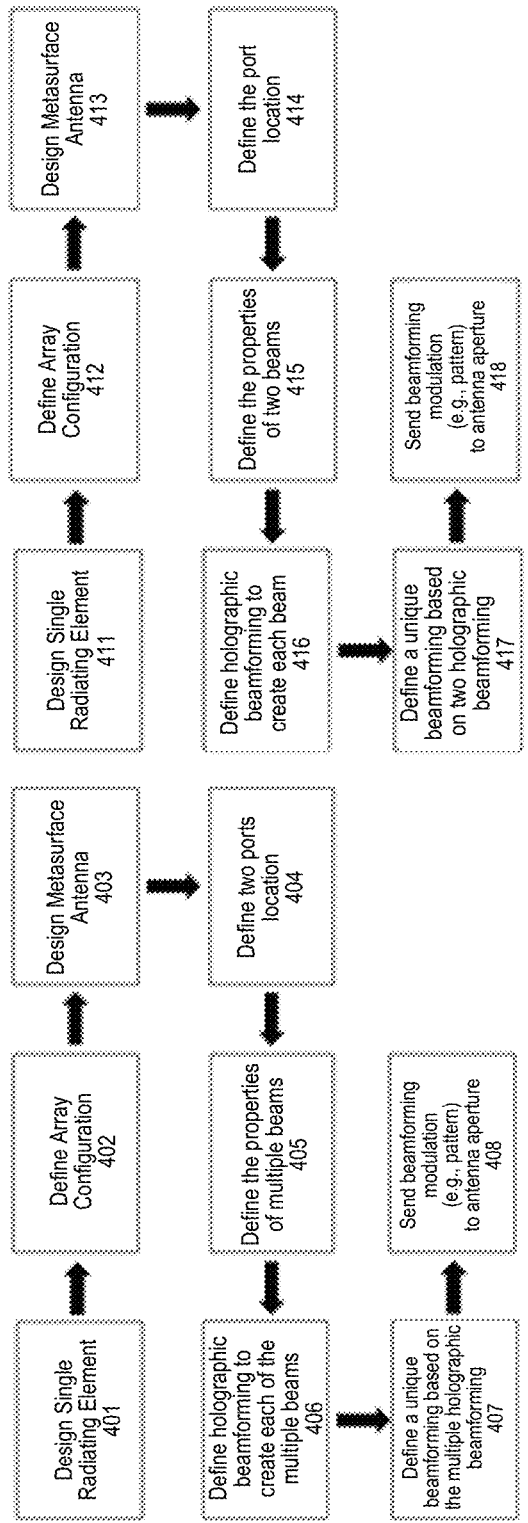
FIG. 4A illustrates one embodiment of a flow diagram of a design process for designing a multibeam antenna with a multi-feed.
FIG. 4B illustrates one embodiment of a flow diagram of a design process for designing a multibeam antenna with a single feed.

FIG. 4A illustrates one embodiment of a flow diagram of a design process for designing a multibeam antenna with a multi-feed. Referring to FIG. 4A, the design process begins by designing the single radiating antenna element (401), defining the array configuration (e.g., multi-feed, etc.) (402), and designing the metasurface antenna in view of the design of the antenna elements and the array configuration (403). The design process includes defining the two port locations (404).

With the location of the two ports, the design process continues by defining the properties of the two beams (405). In one embodiment, these properties include the frequency, pointing angle, and polarization for each of the two beams. Based on these properties, the process defines holographic beamforming modulation to create each beam (406).

Using the holographic beamforming modulation for each beam, the process defines a unique beamforming modulation based on the two holographic beamforming modulation (407). In one embodiment, the unique beamforming modulation is created by combining the two holographic beamforming modulations. In one embodiment, the combining operation comprises an averaging operation that averages the modulation patterns for the two holographic beamforming modulations. The averaging of the modulation patterns can be done by averaging the complex number for corresponding antenna elements in the two holographic beamforming modulations to arrive at one complex number for that antenna element in the modulation pattern for the unique beamforming modulation. Other ways to generate the unique beamforming modulation are described in more detail below. Once the unique beamforming modulation has been created, the process sends the unique beamforming modulation (e.g., the beamforming pattern) to the antenna aperture for use in generating the two beams (408).

FIG. 4B illustrates one embodiment of a flow diagram of a design process for designing a multibeam antenna with a single feed. Referring to FIG. 4B, the design process begins by designing the single radiating antenna element (411), defining the array configuration (e.g., multi-feed, etc.) (412), and designing the metasurface antenna in view of the design of the antenna elements and the array configuration (413). The design process includes defining a location for the single port (414).

With the location of the port, the design process continues by defining the properties of the two beams (415). In one embodiment, these properties include the frequency, pointing angle, and polarization for each of the two beams. Based on these properties, the process defines holographic beamforming modulation to create each beam (416).

Using the holographic beamforming modulation for each beam, the process defines a unique beamforming modulation based on the two holographic beamforming modulation (417). In one embodiment, the unique beamforming modulation is created by combining the two holographic beamforming modulations. In one embodiment, the combining operation comprises an averaging operation that averages the modulation patterns for the two holographic beamforming modulations such as described above in conjunction with FIG. 4A or as is described in more detail herein. Once the unique beamforming modulation has been created, the process sends the unique beamforming modulation (e.g., the beamforming pattern) to the antenna aperture for use in generating the two beams (418).

FIG. 4C illustrates one embodiment of a beamforming process for a multibeam antenna with a multi-feed. The process can be performed by processing logic that can include hardware (e.g., circuitry, dedicated logic, etc.), software (such as running on a general-purpose computer system or a dedicated machine), firmware (e.g., software programmed into a read-only memory), or combinations thereof. In one embodiment, the process is performed by an antenna controller that controls the antenna aperture of RF radiating antenna elements.

Referring to FIG. 4C, the process begins by processing logic defining the holographic beamforming to obtain beams 1-N (processing blocks $420_{1-N}$). Next, processing logic calculates the unique beamforming that creates beams 1-N when the antenna is fed from ports 1 to N, respectively (processing block 421). In one embodiment, this can be done based on the best phase approximation, smaller Euclidean distance, or another mathematical scheme. After calculating the unique beamforming that creates beams 1-N, processing logic defines the available states for beamforming (processing block 422).

FIG. 4D illustrates one embodiment of a beamforming process for a multibeam antenna with a single feed. The process can be performed by processing logic that can include hardware (e.g., circuitry, dedicated logic, etc.), software (such as running on a general-purpose computer system or a dedicated machine), firmware (e.g., software programmed into a read-only memory), or combinations thereof. In one embodiment, the process is performed by an antenna controller that controls the antenna aperture of RF radiating antenna elements.

Referring to FIG. 4D, the process begins by processing logic defining the holographic beamforming to obtain beams 1-N (processing blocks $430_{1-N}$). Next, processing logic calculates the unique beamforming that creates beams 1-N when the antenna is fed from a single port (processing block 431). In one embodiment, this can be done based on the best phase approximation, smaller Euclidean distance, or another mathematical scheme. After calculating the unique beamforming that creates beams 1-N, processing logic defines the available states for beamforming (processing block 432).

In one embodiment, in FIGS. 4C and 4D, different weightings are added for different holographic modulation and the final modulation is created based on weighted holograms that give weight to the creation of each specific beam. The equations below summarize modulations with different weighting where $mod_i$ is the ideal modulation to create a beam number i with respect to port i and $a_i$ is the weighting of the modulation i. EUC is the Euclidean distance of the ideal modulation from the available (feasible) modulations and $\gamma$ is the set of available states.

1.

$$Mod_{total} = \frac{\sum_{i=1}^{N} a_i mod_i}{N}$$

2.

$$\text{Mod}_{total} = \text{argmin}\left\{EUC\left(\frac{\sum_{i=1}^{N}a_i\text{mod}_i}{N}, \gamma\right)\right\},$$

where γ is the set of available states.

3.

$$\text{Mod}_{total} = \text{argmin}\left\{\sum_{i=1}^{N}EUC(a_i\text{mod}_i, \gamma)\right\},$$

where γ is the set of available states.

4. Mod$_{total}$={mod$_1$(elem$_1$, feed$_1$); mod$_2$(elem$_2$, feed$_2$); . . . ; mod$_n$(elem$_n$, feed$_n$)}

5. Any potential modulation pattern based on different optimization techniques such as, for example, but not limited to, Genetic algorithm, convex optimizations, particle swarm, etc. These optimizations are performed on all the RF radiating elements of the aperture to achieve the desired multi-beam performance.

For more information on Euclidean modulation, the Euclidean distance, and available states, see U.S. Pat. No. 10,686,636, titled "Restricted Euclidean Modulation", and issued Jun. 16, 2020, which is well-known in the art.

FIGS. 5A-5D illustrate multiple processes for creating a modulation for the entire aperture to generate multiple beams. These processes are examples of techniques for deriving the unique beamforming modulation by combining the individual holographic beamforming modulation for each of the beams. Referring to FIGS. 5A-5D, stars 501 and 502 are the ideal modulations to create beam one and two respectively. Solid lines in FIGS. 5A-5D show the minimum Euclidean mapping.

Figure 5A:
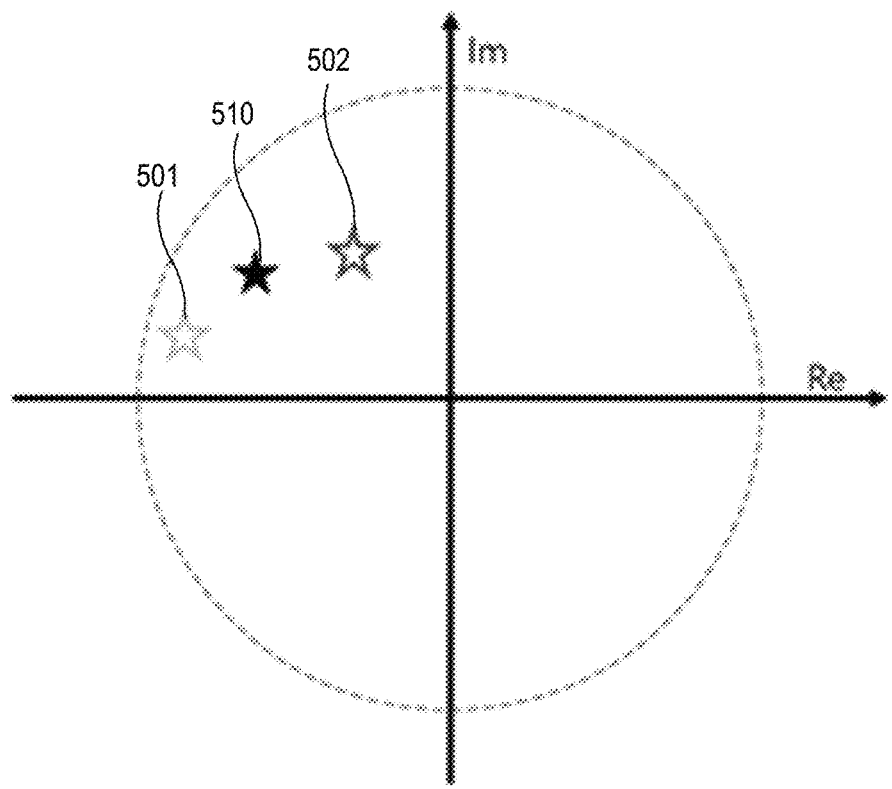
FIGS. 5A-5D illustrate multiple processes for creating a modulation for the entire aperture to generate multiple beams.

Referring to FIG. 5A, the ideal modulations 501 and 502 are illustrated along with star 510 that represents the average of the two ideal modulations 501 and 502. In one embodiment, the antenna controller takes the holographic beamforming patterns for each of the beams and creates the unique beamforming that is applied to the entire aperture by averaging corresponding pattern values in the plurality of modulation patterns for individual RF radiating antenna elements of the plurality of RF radiating antenna elements. In other words, the modulation pattern values (e.g., complex numbers) in each modulation pattern for each element are averaged and that average value is the modulation pattern value for that antenna element in the modulation pattern associated with the unique beamforming modulation that is applied to the entire aperture.

Figure 5B:
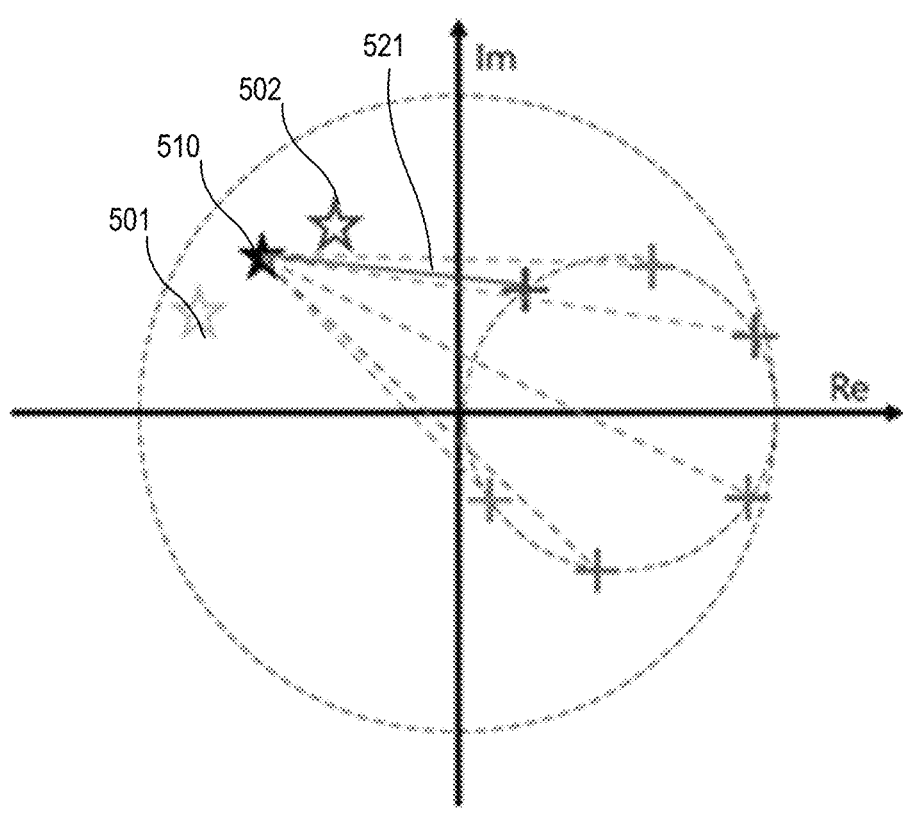

Referring to FIG. 5B, the ideal modulations 501 and 502 are illustrated with star 510 that represents the average of the two modulations. However, in this case, the antenna controller combines holographic beamforming patterns for the plurality of beams into one modulation pattern by averaging corresponding pattern values in the modulation patterns associated with ideal modulations 501 and 502 for individual RF radiating elements of the RF radiating antenna elements and then selects a Euclidean modulation pattern based on the averaged pattern values as the modulation pattern for the unique beamforming modulation that is applied to the entire aperture.

Figure 5C:
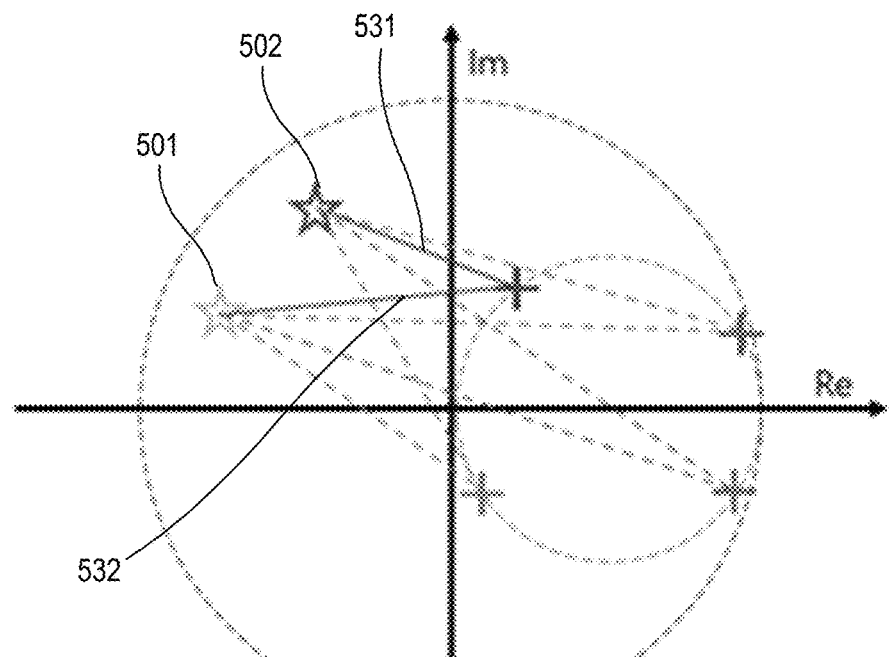

Referring to FIG. 5C, the ideal modulations 501 and 502 are illustrated. To determine the unique beamforming modulation that is applied to the entire aperture, the antenna controller combines holographic beamforming patterns for the beams by calculating a plurality of Euclidean modulation mappings for each the holographic beamforming patterns associated with ideal modulations 501 and 502 for first and second beams, generates a plurality of sums by adding patterns for each of the Euclidean modulation mappings for the first beam to patterns for each of the corresponding Euclidean modulation mappings for the second beam, and then selects, as the unique beamforming modulation that is applied to the entire aperture, the modulation pattern forms the plurality of the sums of the Euclidean modulation mappings having a smallest sum.

Figure 5D:
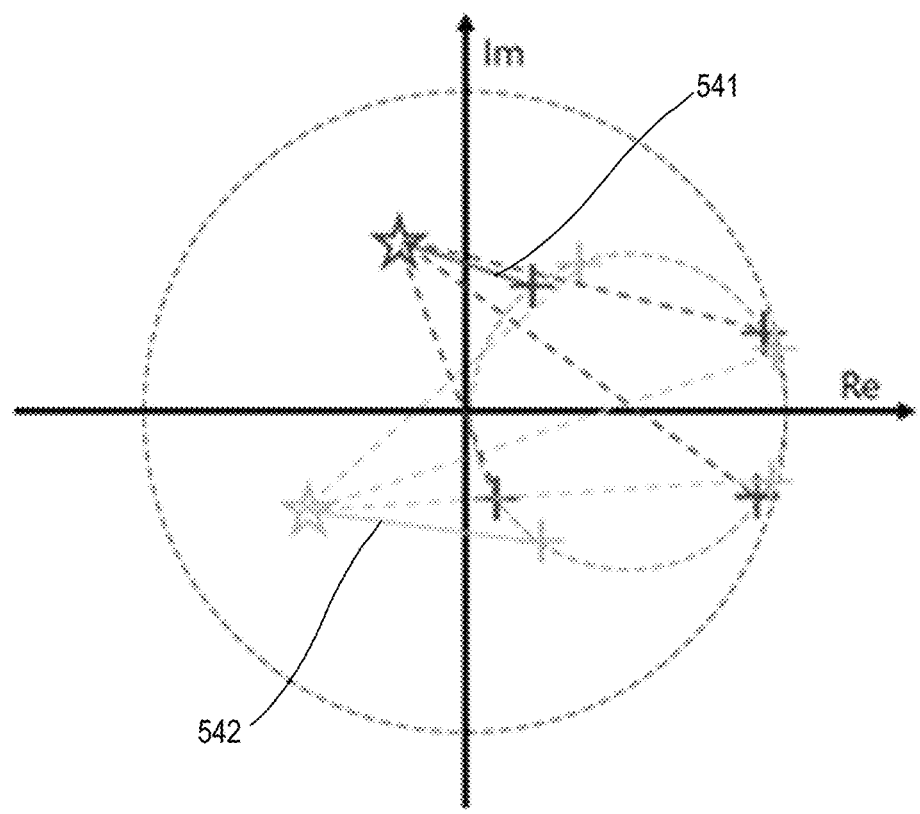

In one embodiment, this method is divided in two parts: hardware and software. In the software part, two modulations are calculated to create beams 1 and 2 from ports 1 and 2, respectively and the appropriate Euclidian mapping is performed to create the feasible modulation pattern. FIG. 5D depicts the proposed modulation scheme. However, on the hardware side, the aperture is composed of elements which are in pairs, and the first modulation to create beam 1 will be applied to the first set of elements and the second modulation to create beam 2 will be applied to the second set of elements.

Figure 5E:
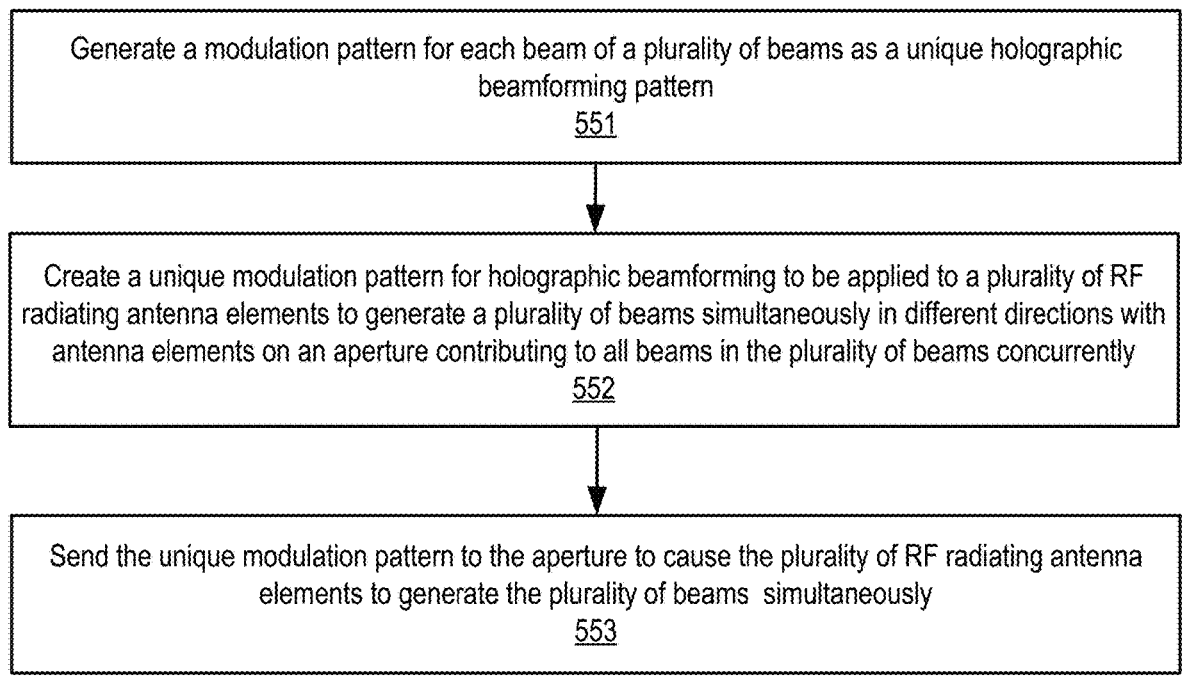
FIG. 5E is a flow diagram of one embodiment of a process for generating multiple beams with an antenna aperture.

FIG. 5E is a flow diagram of one embodiment of a process for generating multiple beams with an antenna aperture having an aperture with a plurality of radio-frequency (RF) radiating antenna elements. The process can be performed by processing logic that can include hardware (e.g., circuitry, dedicated logic, etc.), software (such as is run on a general-purpose computer system or a dedicated machine), firmware (e.g., software programmed into a read-only memory), or combinations thereof. In one embodiment, the process is performed by an antenna controller that controls the antenna aperture of RF radiating antenna elements.

Referring to FIG. 5E, the process begins by generating a modulation pattern for each beam of a plurality of beams as a unique holographic beamforming pattern (processing block 551).

Using the modulation patterns for all the beams, the processing logic creates a first modulation pattern for holographic beamforming to be applied to a plurality of RF radiating antenna elements to generate a plurality of beams simultaneously in different directions with all antenna elements of the aperture contributing to all beams in the plurality of beams concurrently (processing block 552). In one embodiment, the first modulation pattern is a combination of a plurality of modulation patterns, each modulation pattern in the plurality of modulation patterns being for a distinct one of the plurality of beams.

In one embodiment, processing logic creates the first modulation pattern by combining the unique holographic beamforming patterns for the plurality of beams into the first modulation pattern. In one embodiment, processing logic combines holographic beamforming patterns for the plurality of beams into the first modulation pattern by averaging corresponding pattern values in the plurality of modulation patterns for individual RF radiating elements of the plurality of RF radiating antenna elements.

In another embodiment, processing logic combines holographic beamforming patterns for the plurality of beams into the first modulation pattern by applying different weightings to different holographic beamforming patterns when combining the unique holographic beamforming patterns into the first modulation pattern.

In other embodiments, processing logic combines holographic beamforming patterns for the plurality of beams into the first modulation pattern by one or more of the following:

1) averaging corresponding pattern values in the plurality of modulation patterns for individual RF radiating elements of the plurality of RF radiating antenna elements, and then selecting a Euclidean modulation pattern based on the one modulation pattern as the first modulation pattern;

2) calculating a plurality of Euclidean modulation mappings for each the holographic beamforming patterns for first and second beams of the plurality of beams, generating a plurality of sums by adding patterns for each of the Euclidean modulation mappings for the first beam to patterns for each of the corresponding Euclidean modulation mappings for the second beam, and then selecting, as the unique modulation pattern, the modulation pattern from the plurality of sums of Euclidean modulation mapping having a smallest sum;

3) calculating two modulations are to create beams 1 and 2 from ports 1 and 2, respectively, perform the appropriate Euclidian mapping to create the feasible modulation pattern, and apply the first modulation to create beam 1 to the first set of elements to create beam 1 and the second modulation to the second set of elements to create beam 2.

Next, processing logic sends the first modulation pattern to the aperture to cause the plurality of RF radiating antenna elements to generate a plurality of beams simultaneously (processing block 552).

Note that different weightings can impact antenna performance. For example, if one of the beams is given a higher weight, the aperture efficiency and directivity for that beam is higher. If both beams may be given specific weights to get similar aperture efficiency for both beams. These weights may be different.

While the techniques have been described above in conjunction with a metasurface antenna as an active radiator where the feeds have been incorporated into the antenna, the techniques are not limited to use in this way. Alternatively, the proposed techniques can also cover the passive metasurface antennas where the metasurface is simply a reflector while two independent feed antennas (e.g., Horn antennas) are illuminating the metasurface and two different beams are produced.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas.

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
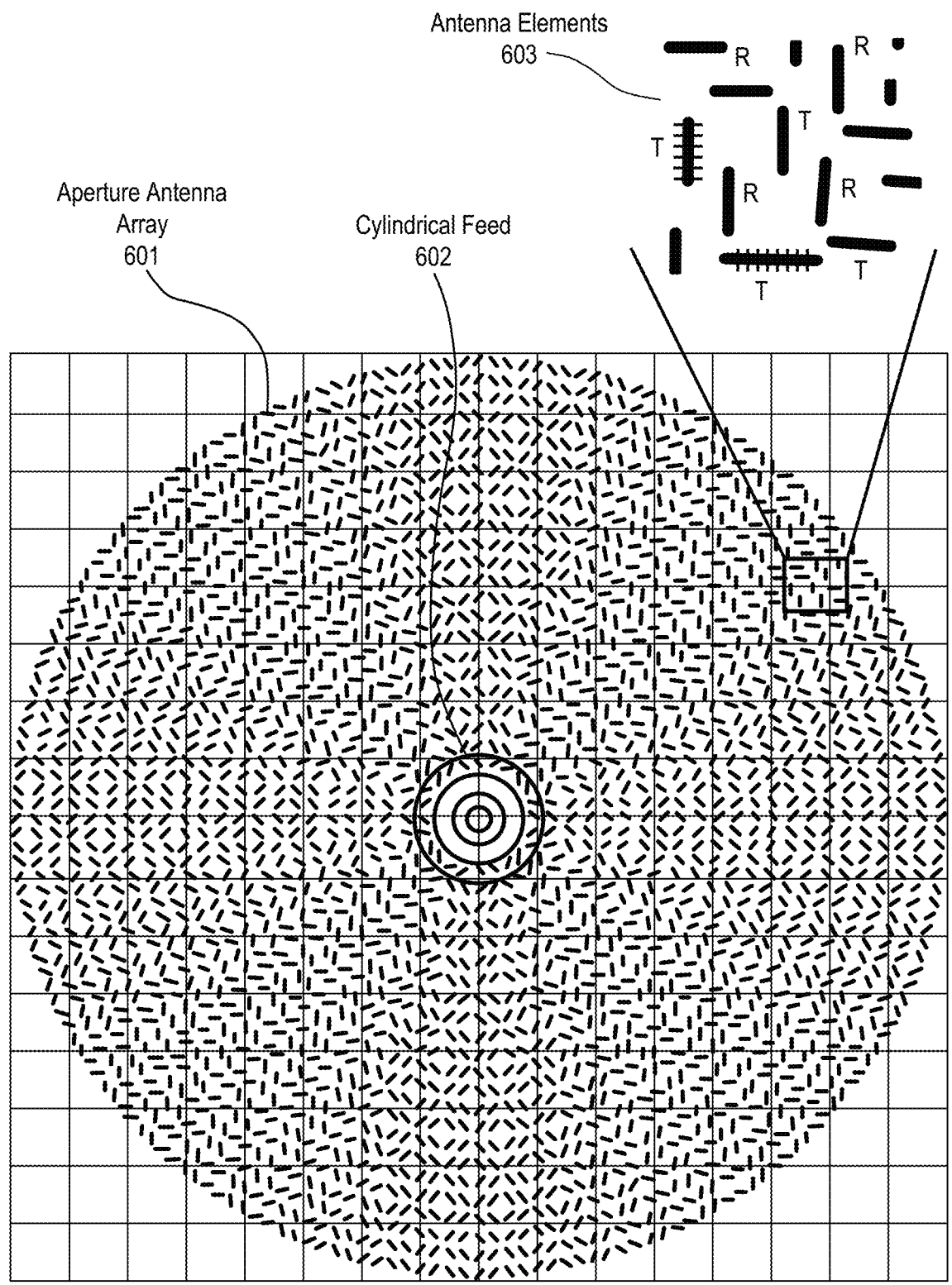
FIG. 6 illustrates an aperture having one or more arrays of antenna elements placed in concentric rings around an input feed of the cylindrically fed antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beamforming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
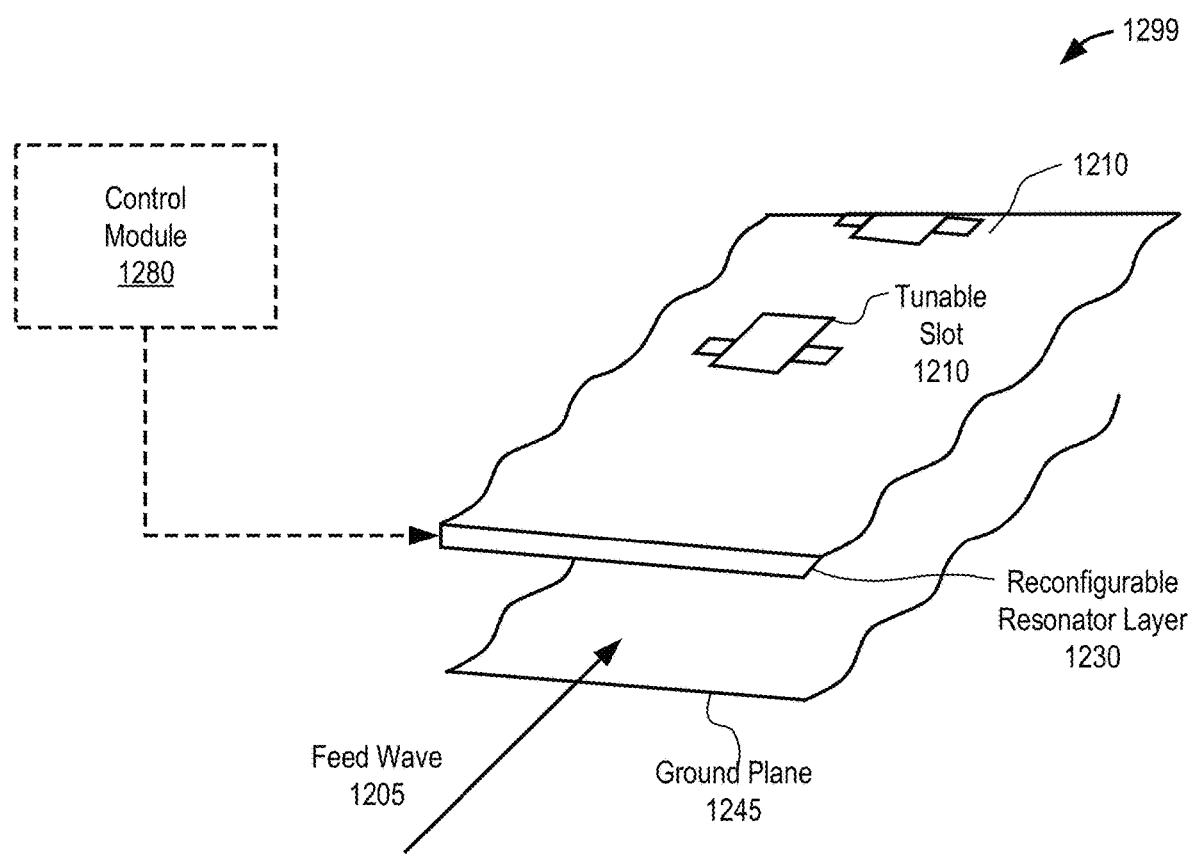
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
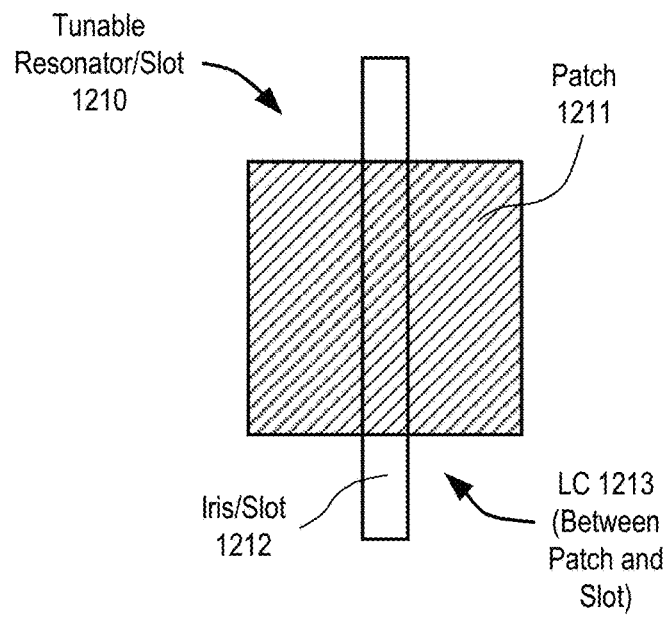
FIG. 8A illustrates one embodiment of a tunable resonator/slot.

Control module 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each Figure, a control module similar to control module 1280 may drive each array of tunable slots described in the Figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram} = w_{in} w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
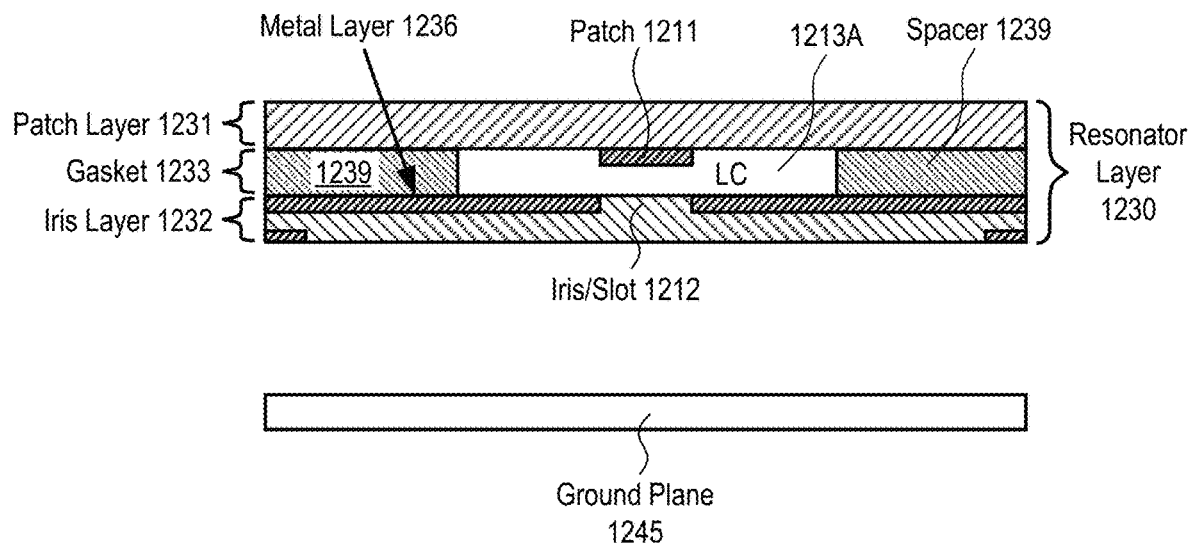
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1232, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 7, may have a microwave frequency compatible with satellite communication channels. The feed wave propagates between ground plane 1245 and resonator layer 1230.

Reconfigurable resonator layer 1230 also includes gasket layer 1233 and patch layer 1231. Gasket layer 1233 is disposed between patch layer 1231 and iris layer 1232. Note that in one embodiment, a spacer could replace gasket layer 1233. In one embodiment, iris layer 1232 is a printed circuit board ("PCB") that includes a copper layer as metal layer 1236. In one embodiment, iris layer 1232 is glass. Iris layer 1232 may be other types of substrates.

Openings may be etched in the copper layer to form slots 1212. In one embodiment, iris layer 1232 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1233 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213A is defined by spacers 1239, iris layer 1232 and metal layer 1236. When the chamber is filled with liquid crystal, patch layer 1231 can be laminated onto spacers 1239 to seal liquid crystal within resonator layer 1230.

A voltage between patch layer 1231 and iris layer 1232 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 6. Note that in this example the antenna array has two different types of antenna elements that are used for two different types of frequency bands.

Figure 9A:
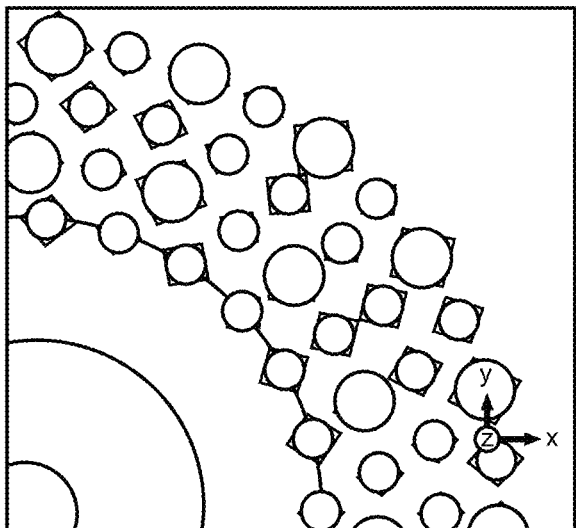
FIG. 9A illustrates a portion of the first iris board layer with locations corresponding to the slots.
Figure 9B:
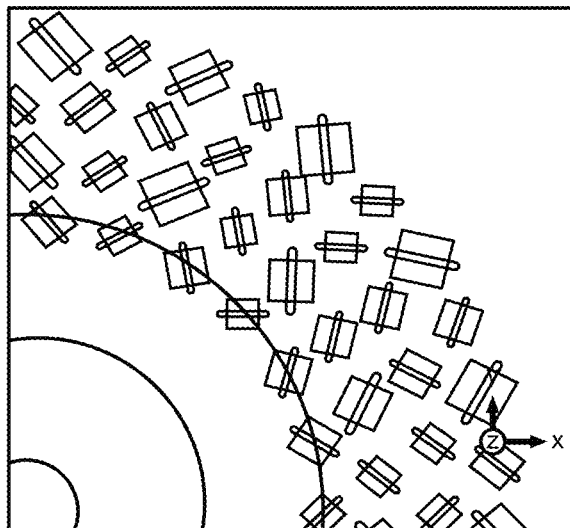
FIG. 9B illustrates a portion of the second iris board layer containing slots.
Figure 9C:
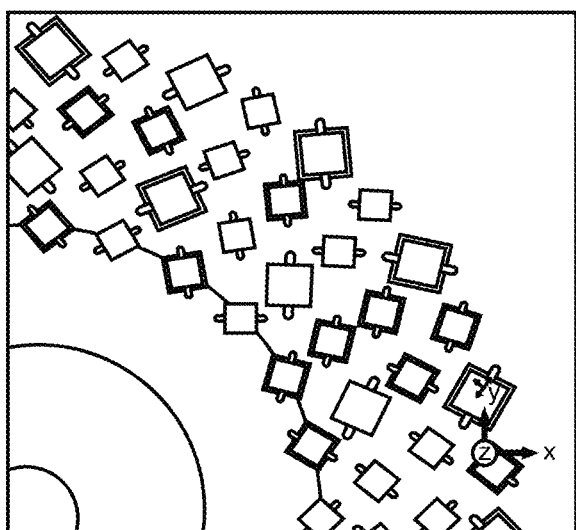
FIG. 9C illustrates patches over a portion of the second iris board layer.
Figure 9D:
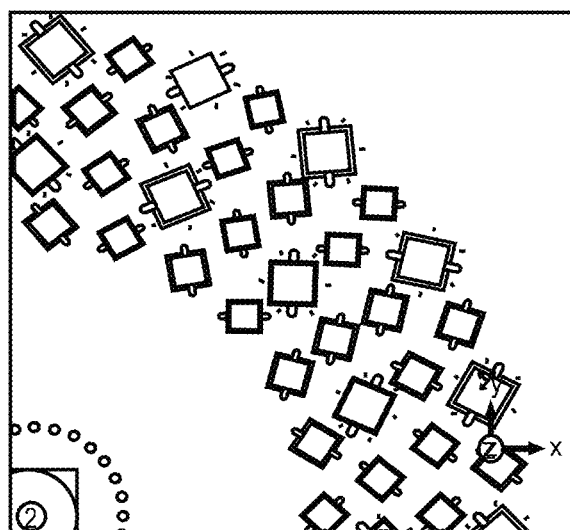
FIG. 9D illustrates a top view of a portion of the slotted array.

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
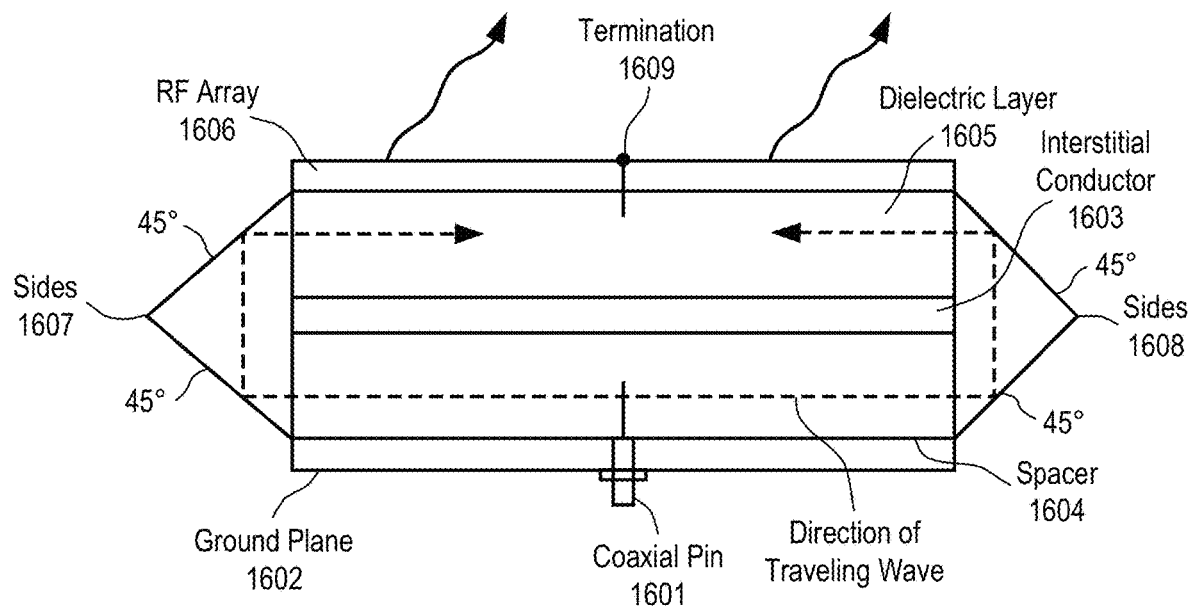
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be λ/2, where λ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beamforming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower-level feed to upper-level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
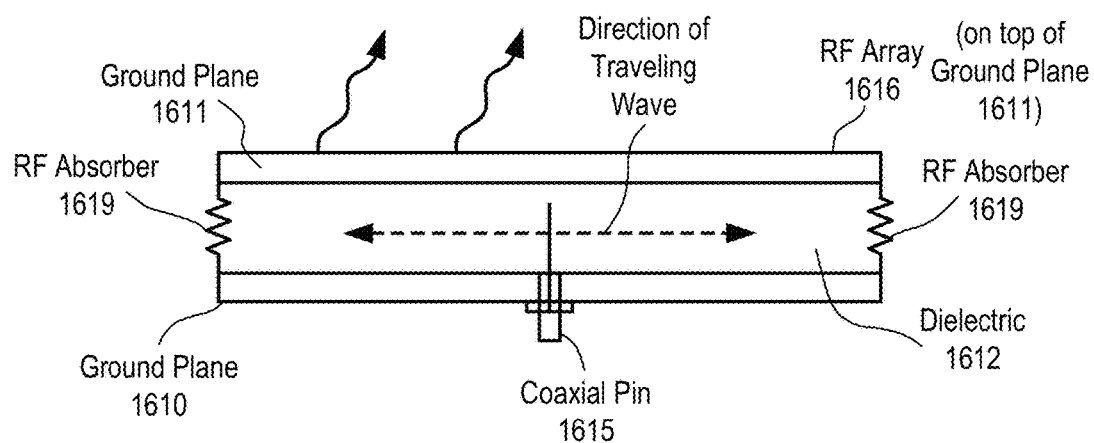
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beamforming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
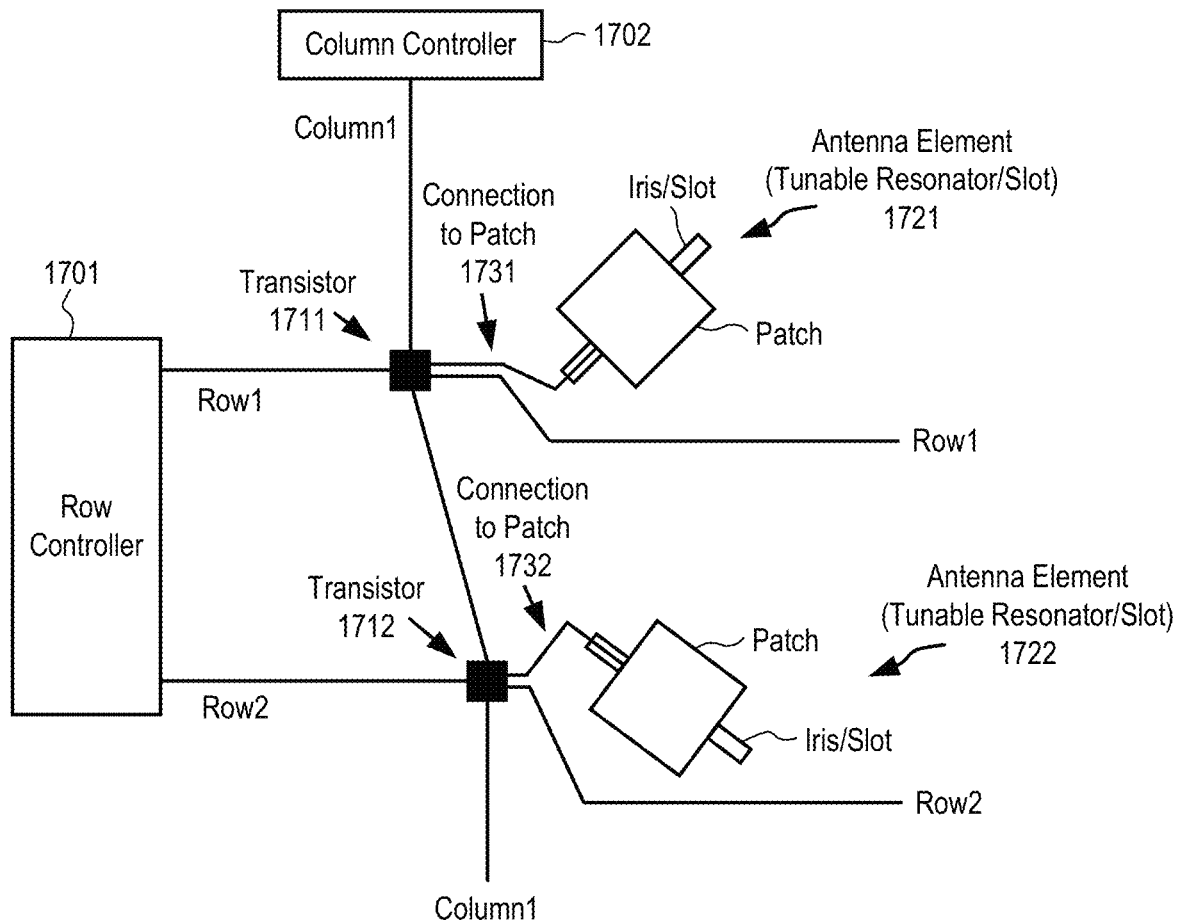
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
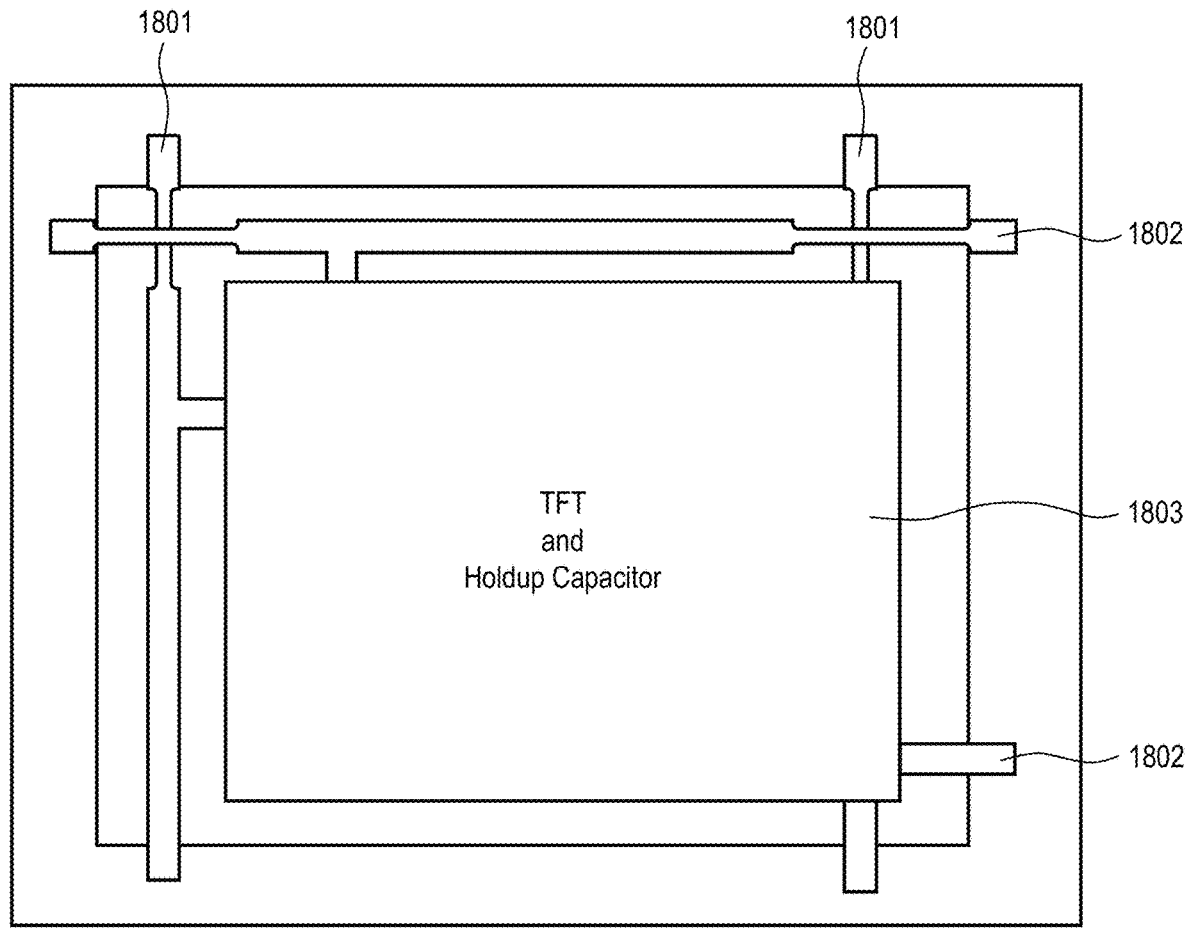
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
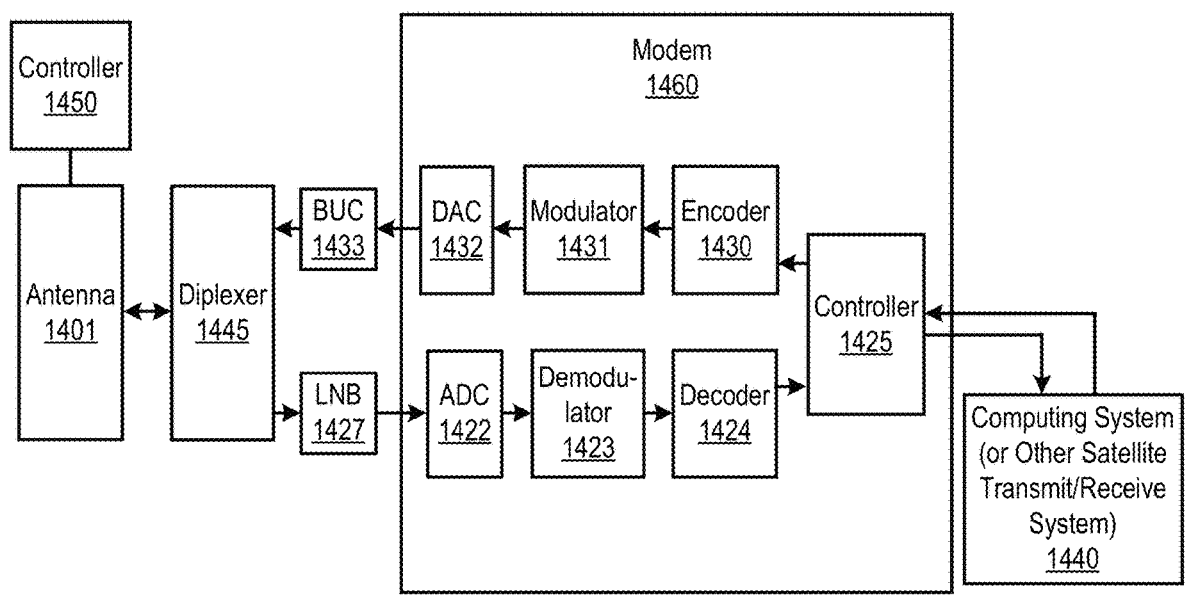
FIG. 14 is a block diagram of another embodiment of a communication system having simultaneous transmit and receive paths.

In another embodiment, the combined antenna apertures are used in a full duplex communication system. FIG. 14 is a block diagram of another embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNB) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is an antenna comprising: an aperture having a plurality of radio-frequency (RF) radiating antenna elements to generate a plurality of beams simultaneously in different directions in response to a first modulation pattern for beamforming applied to the plurality of RF radiating antenna elements to establish all beams of the plurality of beams such that antenna elements of the plurality of RF radiating antenna elements contribute to all beams in the plurality of beams concurrently; and a controller coupled to the aperture to generate the first modulation pattern.

Example 2 is the antenna of example 1 that may optionally include that the first modulation pattern is a combination of a plurality of modulation patterns, each modulation pattern in the plurality of modulation patterns being for a distinct one of the plurality of beams.

Example 3 is the antenna of example 2 that may optionally include that the controller is operable to generate each modulation pattern for each beam of the plurality of beams as a separate beamforming pattern, combine the separate holographic beamforming patterns for the plurality of beams into the first modulation pattern, and send the first modulation pattern to the aperture.

Example 4 is the antenna of example 3 that may optionally include that the controller is operable combine beamforming patterns for the plurality of beams into the first modulation pattern by averaging corresponding pattern values in the plurality of modulation patterns for individual RF radiating elements of the plurality of RF radiating antenna elements.

Example 5 is the antenna of example 3 that may optionally include that the controller is operable to combine beamforming patterns for the plurality of beams into one modulation pattern by: averaging corresponding pattern values in the plurality of modulation patterns for individual RF radiating elements of the plurality of RF radiating antenna elements, and then selecting a Euclidean modulation pattern based on the one modulation pattern as the first modulation pattern.

Example 6 is the antenna of example 3 that may optionally include that the controller is operable combine beamforming patterns for the plurality of beams into the first modulation pattern by: calculating a plurality of Euclidean modulation mappings for each the beamforming patterns for first and second beams of the plurality of beams; generating a plurality of sums by adding patterns for each of the Euclidean modulation mappings for first beam to patterns for each of the corresponding Euclidean modulation mappings for the second beam, and then selecting, as the first modulation pattern, the Euclidean modulation pattern for the Euclidean modulation mapping having a smallest sum from the plurality of sums.

Example 7 is the antenna of example 3 that may optionally include that the controller is operable combine beamforming patterns for the plurality of beams into the first modulation pattern by: selecting a Euclidean modulation pattern associated with a closest Euclidean modulation mapping for each of the beamforming patterns for the plurality of beams; and averaging the Euclidean modulation patterns for the closest Euclidean modulation mappings for the plurality of the beamforming patterns.

Example 8 is the antenna of example 3 that may optionally include that the controller is operable to apply different weightings to different beamforming patterns when combining the separate beamforming patterns into the first modulation pattern.

Example 9 is the antenna of example 1 that may optionally include that the first modulation pattern for beamforming comprises a first modulation pattern for holographic beamforming.

Example 10 is the antenna of example 1 that may optionally include that the aperture comprises a metasurface.

Example 11 is the antenna of example 10 that may optionally include that the metasurface comprises a single feed port to provide a feed wave to the plurality of RF radiating antenna elements.

Example 12 is the antenna of example 10 that may optionally include that the metasurface comprises a plurality of feed ports to provide a plurality of feed waves to the plurality of RF radiating antenna elements simultaneously.

Example 13 is an antenna comprising: a metasurface having a single feed port to provide a feed wave, and a plurality of radio-frequency (RF) radiating antenna elements to generate, in response to the feed wave, a plurality of beams simultaneously in different directions in response to a first modulation pattern for holographic beamforming applied to the plurality of RF radiating antenna elements to establish all beams of the plurality of beams such that antenna elements of the plurality of RF radiating antenna elements contribute to all beams in the plurality of beams concurrently; and a controller coupled to the aperture to generate the first modulation pattern, wherein the first modulation pattern is a combination of a plurality of modulation patterns, each modulation pattern in the plurality of modulation patterns being for a distinct one of the plurality of beams, where the controller is operable to generate each modulation pattern for each beam of the plurality of beams as a unique holographic beamforming pattern, combine the unique holographic beamforming patterns for the plurality of beams into the first modulation pattern, and send the first modulation pattern to the aperture.

Example 14 is the antenna of example 13 that may optionally include that the controller is operable combine holographic beamforming patterns for the plurality of beams into the first modulation pattern by averaging corresponding pattern values in the plurality of modulation patterns for individual RF radiating elements of the plurality of RF radiating antenna elements.

Example 15 is the antenna of example 13 that may optionally include that the controller is operable to combine holographic beamforming patterns for the plurality of beams into one modulation pattern by, one or more of: averaging corresponding pattern values in the plurality of modulation patterns for individual RF radiating elements of the plurality of RF radiating antenna elements, and then selecting a Euclidean modulation pattern based on the one modulation pattern as the first modulation pattern; or calculating a plurality of Euclidean modulation mappings for each the holographic beamforming patterns for first and second beams of the plurality of beams; generating a plurality of sums by adding patterns for each of the Euclidean modulation mappings for first beam to patterns for each of the corresponding Euclidean modulation mappings for the second beam, and then selecting, as the first modulation pattern, the Euclidean modulation pattern for the Euclidean modulation mapping having a smallest sum from the plurality of sums; or selecting a Euclidean modulation pattern associated with a closest Euclidean modulation mapping for each of the holographic beamforming patterns for the plurality of beams; and averaging the Euclidean modulation patterns for the closest Euclidean modulation mappings for the plurality of the holographic beamforming patterns.

Example 16 is a method for controlling an antenna having an aperture with a plurality of radio-frequency (RF) radiating antenna elements, the method creating a first modulation pattern for beamforming to be applied to the plurality of RF radiating antenna elements to generate a plurality of beams simultaneously in different directions with antenna elements of the plurality of RF radiating antenna elements contributing to all beams in the plurality of beams concurrently; and sending the first modulation pattern to the aperture to cause the plurality of RF radiating antenna elements to generate a plurality of beams simultaneously.

Example 17 is the method of example 16 that may optionally include that the first modulation pattern is a combination of a plurality of modulation patterns, each modulation pattern in the plurality of modulation patterns being for a distinct one of the plurality of beams.

Example 18 is the method of example 17 that may optionally include generating each modulation pattern for each beam of the plurality of beams as a unique holographic beamforming pattern and combining the unique holographic beamforming patterns for the plurality of beams into the first modulation pattern.

Example 19 is the method of example 16 that may optionally include that combining holographic beamforming patterns for the plurality of beams into the first modulation pattern comprises averaging corresponding pattern values in the plurality of modulation patterns for individual RF radiating elements of the plurality of RF radiating antenna elements.

Example 20 is the method of example 16 that may optionally include that combining the unique holographic beamforming patterns into the first modulation pattern comprises applying different weightings to different holographic beamforming patterns when combining the unique holographic beamforming patterns into the first modulation pattern.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An antenna comprising:
    an aperture having a plurality of radio-frequency (RF) radiating antenna elements to generate a plurality of beams simultaneously in different directions in response to a first modulation pattern for beamforming applied to the plurality of RF radiating antenna elements to establish all beams of the plurality of beams such that antenna elements of the plurality of RF radiating antenna elements contribute to all beams in the plurality of beams concurrently, wherein the first modulation pattern is a combination of a plurality of modulation patterns, each modulation pattern in the plurality of modulation patterns being for a distinct one of the plurality of beams; and
    a controller coupled to the aperture to generate the first modulation pattern, wherein the controller is operable to generate each modulation pattern for each beam of the plurality of beams as a separate holographic beamforming pattern, combine the separate holographic beamforming patterns for the plurality of beams into the first modulation pattern, and send the first modulation pattern to the aperture.

2. The antenna of claim 1 wherein the controller is operable to combine beamforming patterns for the plurality of beams into the first modulation pattern by averaging corresponding pattern values in the plurality of modulation patterns for individual RF radiating elements of the plurality of RF radiating antenna elements.

3. The antenna of claim 1 wherein the controller is operable to combine beamforming patterns for the plurality of beams into one modulation pattern by:
    averaging corresponding pattern values in the plurality of modulation patterns for individual RF radiating elements of the plurality of RF radiating antenna elements, and
    then selecting a Euclidean modulation pattern based on the one modulation pattern as the first modulation pattern.

4. The antenna of claim 1 wherein the controller is operable to combine beamforming patterns for the plurality of beams into the first modulation pattern by:
    calculating a plurality of Euclidean modulation mappings for each the beamforming patterns for first and second beams of the plurality of beams;
    generating a plurality of sums by adding patterns for each of the Euclidean modulation mappings for first beam to patterns for each of the corresponding Euclidean modulation mappings for the second beam, and
    then selecting, as the first modulation pattern, the Euclidean modulation pattern for the Euclidean modulation mapping having a smallest sum from the plurality of sums.

5. The antenna of claim 1 wherein the controller is operable to combine beamforming patterns for the plurality of beams into the first modulation pattern by:
    selecting a Euclidean modulation pattern associated with a closest Euclidean modulation mapping for each of the beamforming patterns for the plurality of beams; and
    averaging the Euclidean modulation patterns for the closest Euclidean modulation mappings for the plurality of the beamforming patterns.

6. The antenna of claim 1 wherein the controller is operable to apply different weightings to different beamforming patterns when combining the separate beamforming patterns into the first modulation pattern.

7. The antenna of claim 1 wherein the first modulation pattern for beamforming comprises a first modulation pattern for holographic beamforming.

8. The antenna of claim 1 wherein the aperture comprises a metasurface.

9. The antenna of claim 8 wherein the metasurface comprises a single feed port to provide a feed wave to the plurality of RF radiating antenna elements.

10. The antenna of claim 8 wherein the metasurface comprises a plurality of feed ports to provide a plurality of feed waves to the plurality of RF radiating antenna elements simultaneously.

11. An antenna comprising:
a metasurface having a single feed port to provide a feed wave, and a plurality of radio-frequency (RF) radiating antenna elements to generate, in response to the feed wave, a plurality of beams simultaneously in different directions in response to a first modulation pattern for holographic beamforming applied to the plurality of RF radiating antenna elements to establish all beams of the plurality of beams such that antenna elements of the plurality of RF radiating antenna elements contribute to all beams in the plurality of beams concurrently; and a controller coupled to an aperture to generate the first modulation pattern, wherein the first modulation pattern is a combination of a plurality of modulation patterns, each modulation pattern in the plurality of modulation patterns being for a distinct one of the plurality of beams, the controller being operable to generate each modulation pattern for each beam of the plurality of beams as a unique holographic beamforming pattern, combine the unique holographic beamforming patterns for the plurality of beams into the first modulation pattern, and send the first modulation pattern to the aperture.

12. The antenna of claim 9 wherein the controller is operable to combine holographic beamforming patterns for the plurality of beams into the first modulation pattern by averaging corresponding pattern values in the plurality of modulation patterns for individual RF radiating elements of the plurality of RF radiating antenna elements.

13. The antenna of claim 9 wherein the controller is operable to combine holographic beamforming patterns for the plurality of beams into one modulation pattern by, one or more of:
averaging corresponding pattern values in the plurality of modulation patterns for individual RF radiating elements of the plurality of RF radiating antenna elements, and
then selecting a Euclidean modulation pattern based on the one modulation pattern as the first modulation pattern; or
calculating a plurality of Euclidean modulation mappings for each the holographic beamforming patterns for first and second beams of the plurality of beams;
generating a plurality of sums by adding patterns for each of the Euclidean modulation mappings for first beam to patterns for each of the corresponding Euclidean modulation mappings for the second beam, and
then selecting, as the first modulation pattern, the Euclidean modulation pattern for the Euclidean modulation mapping having a smallest sum from the plurality of sums; or
selecting a Euclidean modulation pattern associated with a closest Euclidean modulation mapping for each of the holographic beamforming patterns for the plurality of beams; or
averaging the Euclidean modulation patterns for the closest Euclidean modulation mappings for the plurality of the holographic beamforming patterns.

14. A method for controlling an antenna having an aperture with a plurality of radio-frequency (RF) radiating antenna elements, the method comprising:
creating a first modulation pattern for beamforming to be applied to the plurality of RF radiating antenna elements to generate a plurality of beams simultaneously in different directions with antenna elements of the plurality of RF radiating antenna elements contributing to all beams in the plurality of beams concurrently, wherein the first modulation pattern is a combination of a plurality of modulation patterns, each modulation pattern in the plurality of modulation patterns being for a distinct one of the plurality of beams;
generating each modulation pattern for each beam of the plurality of beams as a unique holographic beamforming pattern and combining the unique holographic beamforming patterns for the plurality of beams into the first modulation pattern, and
sending the first modulation pattern to the aperture to cause the plurality of RF radiating antenna elements to generate a plurality of beams simultaneously.

15. The method of claim 14 wherein combining holographic beamforming patterns for the plurality of beams into the first modulation pattern comprises averaging corresponding pattern values in the plurality of modulation patterns for individual RF radiating elements of the plurality of RF radiating antenna elements.

16. The method of claim 14 wherein combining the unique holographic beamforming patterns into the first modulation pattern comprises applying different weightings to different holographic beamforming patterns when combining the unique holographic beamforming patterns into the first modulation pattern.

* * * * *